United States Patent
Dudar

(10) Patent No.: US 10,301,166 B2
(45) Date of Patent: May 28, 2019

(54) SYSTEMS AND METHODS FOR CONTROLLING VEHICLE REFUELING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/288,717

(22) Filed: Oct. 7, 2016

(65) Prior Publication Data
US 2018/0099856 A1     Apr. 12, 2018

(51) Int. Cl.
| B67D 7/04 | (2010.01) |
|---|---|
| B67D 7/54 | (2010.01) |
| B60K 15/035 | (2006.01) |

(52) U.S. Cl.
CPC ........ B67D 7/049 (2013.01); B60K 15/03504 (2013.01); B60K 15/03519 (2013.01); B67D 7/048 (2013.01); B67D 7/0492 (2013.01); B67D 7/54 (2013.01); B60K 2015/03514 (2013.01); B60K 2015/03557 (2013.01); B60K 2015/03576 (2013.01)

(58) Field of Classification Search
CPC .... B67D 7/048; B67D 7/0476; B67D 7/0478; B67D 7/0482; B67D 7/0484; B67D 7/0486; B67D 7/0488; B67D 7/049; B67D 7/0492; B67D 7/54; B60K 15/03504; B60K 2015/03514; B60K 15/03519; B60K 2015/03557; B60K 2015/03576
See application file for complete search history.

(56) References Cited

U.S. PATENT DOCUMENTS

| 5,570,672 | A | 11/1996 | Kunimitsu et al. |
|---|---|---|---|
| 5,692,480 | A * | 12/1997 | Kato ................. B60K 15/03504 123/519 |
| 5,992,395 | A | 11/1999 | Hartsell, Jr. et al. |
| 6,095,204 | A | 8/2000 | Healy |
| 6,169,938 | B1 * | 1/2001 | Hartsell, Jr. ......... B67D 7/0401 141/198 |
| 6,305,440 | B1 | 10/2001 | McCall et al. |
| 6,612,324 | B2 | 9/2003 | Szlaga |
| 6,851,458 | B2 * | 2/2005 | Nakajima ........ B60K 15/03519 123/516 |
| 6,923,221 | B2 * | 8/2005 | Riffle ................... B67D 7/0478 141/197 |

(Continued)

*Primary Examiner* — Andrew D Stclair
(74) *Attorney, Agent, or Firm* — Julia Voutyras; McCoy Russell LLP

(57) ABSTRACT

Methods and systems are provided for refueling a vehicle configured with an onboard refueling vapor recovery (ORVR) system, such that a loading of a fuel vapor canister configured to capture and store fuel vapors, is reduced. In one example, during the refueling, a rate at which fuel vapors are routed to the fuel vapor canister is adjusted responsive to an indication that the vehicle is refueling at a gas station equipped with offboard fuel vapor recovery infrastructure. In this way, loading of the fuel vapor canister may be reduced which may prevent undesired bleedthrough emissions resulting from a canister loaded with fuel vapors, particularly in examples where the vehicle is a hybrid vehicle and where engine runtime is limited, thus limiting potential opportunities for purging of the fuel vapor canister.

14 Claims, 8 Drawing Sheets

(56) References Cited

U.S. PATENT DOCUMENTS

| | | | |
|---|---|---|---|
| 7,055,556 B2 | 6/2006 | Benjey et al. | |
| 8,573,262 B2 | 11/2013 | Hughes | |
| 2007/0131111 A1* | 6/2007 | Hart | B01D 53/0407 95/146 |
| 2010/0153207 A1* | 6/2010 | Roberts | G01C 21/3679 705/14.41 |
| 2015/0211952 A1* | 7/2015 | Yang | G01M 3/025 73/40.5 R |

* cited by examiner

SYSTEMS AND METHODS FOR CONTROLLING VEHICLE REFUELING

FIELD

The present description relates generally to methods and systems for directing refueling vapors to either an onboard vapor recovery system or to an offboard vapor recovery system.

BACKGROUND/SUMMARY

Fuel vapors generated during refueling events may, in some examples, be adsorbed into an onboard refueling canister configured to store fuel vapors from refueling and diurnal engine operations. In other examples, refueling vapors may be recovered offboard into an underground tank at a gas station.

For vehicles configured to adsorb refueling vapors via an onboard refueling canister, the canister may be sized to adsorb refueling, running loss, hot soak, and diurnal cycle vapors. In such an example, refueling vapors may determine the bulk of the canister size, as refueling vapors may represent the largest fraction of total vapors adsorbed by the canister. An example of such a system is referred to as onboard refueling vapor recovery (ORVR). For ORVR vehicle systems, fuel vapor adsorbed into the onboard refueling canister is subsequently drawn from the canister into an engine intake manifold (under intake manifold vacuum conditions) for combustion with the normal fuel and air mixture, in a process referred to as purging.

For vehicles configured to recover refueling vapors into an underground tank at a gas station, the canister may be much smaller, as refueling vapors are recovered by the gas station infrastructure. In such an example, specially designed refueling nozzles with boots that seal around a fuel filler neck may route refueling vapors into an underground tank where the vapors are condensed. Such an example is referred to as non-ORVR.

Vehicles on the road may be a mixture of ORVR and non-ORVR. Similarly, gas stations may be configured for either offboard recovery, or onboard recovery. If a vehicle with an ORVR system refuels at a station with offboard recovery capabilities, and no mitigating actions are taken, a number of undesirable outcomes may result. For example, in attempting to route fuel vapors to an underground storage tank, while the vehicle is configured to route fuel vapors to an onboard storage canister, energy may be wasted, wear and tear of the offboard system may be increased, and an excess of air may be ingested into the underground storage tank, which may result in undesired pressure buildup due to the expanded volume of hydrocarbon saturated air.

Toward this end, U.S. Pat. No. 5,992,395 teaches detecting a vehicle having an ORVR system during refueling by monitoring for the presence of hydrocarbon vapors in a vapor recovery path to an underground storage tank. In such an example, an absence of detected hydrocarbon vapors may indicate the presence of an ORVR system in the vehicle being refueled. Responsive to indicating that the vehicle being refueled includes an ORVR system, the dispenser may deactivate the offboard vapor recovery system, or may redirect the air flow in the vapor recovery path to atmosphere.

However, the inventors herein have recognized potential issues with such an approach. For example, for a vehicle with an ORVR system, including a canister sized to capture refueling vapors, the canister may be unnecessarily loaded during refueling at a gas station with offboard fuel vapor recovery infrastructure. More specifically, vehicles such as hybrid electric vehicles (HEVs), and start/stop (S/S), may spend considerable time in electric-only driving mode. Because purging of the canister relies on intake manifold vacuum, purging of the canister may not be conducted during electric-only driving mode. For such vehicles, unnecessary loading of the canister may contribute to a risk of hydrocarbon breakthrough from the canister to atmosphere.

Thus, the inventors herein have developed systems and methods to at least partially address the above issues. In one example, a method is provided, comprising during refueling a fuel tank of a vehicle at a gas station, routing fuel vapors from the fuel tank to a fuel vapor storage canister positioned in an evaporative emissions system that is removably coupled to the fuel tank; and during the refueling, adjusting a rate of the routing fuel vapors to the canister responsive to an indication of a vehicle offboard fuel vapor recovery infrastructure at the gas station.

As an example, adjusting the rate of routing fuel vapors from the fuel tank to the fuel vapor canister may include decreasing the rate of routing fuel vapors from the fuel tank to the fuel vapor canister responsive to the indication of the offboard fuel vapor recovery infrastructure, as compared to a condition where offboard fuel vapor recovery infrastructure is not indicated. Responsive to adjusting the rate of routing fuel vapors from the fuel tank to the fuel vapor storage canister, a greater portion of refueling vapors may be directed to the offboard fuel vapor storage infrastructure, than to the fuel vapor storage canister. In this way, loading of the fuel vapor canister may be reduced which may prevent undesired bleedthrough emissions resulting from a canister loaded with fuel vapors, particularly in examples where the vehicle is a hybrid vehicle and where engine runtime is limited.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for conducting a refueling operation on a vehicle that includes an onboard refueling vapor recovery (ORVR) system. Such a vehicle may comprise a hybrid vehicle, such as the vehicle propulsion system indicated in FIG. 1. However, it may be understood that the hybrid vehicle system is exemplary, and the systems and methods discussed herein may additionally be utilized on a vehicle system that is not a hybrid vehicle, without departing from the scope of this disclosure. The ORVR vehicle may include an engine, coupled to a fuel system and evaporative emissions system, where the evaporative emissions system includes a fuel vapor canister for capturing and storing fuel vapors, as illustrated in FIG. 2. The fuel system may include a variable orifice valve positioned in a fuel vapor recirculation line, and a fuel tank isolation valve positioned in a conduit coupling the fuel system to the evaporative emissions system, further illustrated in FIG. 2. The variable orifice valve may be commanded open, and the fuel tank isolation valve may be duty cycled, responsive to an indication that the ORVR vehicle is attempting to refuel at a gas station equipped with offboard fuel vapor recovery infrastructure, such as the station illustrated in FIG. 3. By commanding open the variable orifice valve and duty cycling the fuel tank isolation valve, fuel vapors generated during refueling the ORVR vehicle may be routed to the offboard fuel vapor recovery infrastructure, rather than loading the fuel vapor canister with refueling vapors.

Figure 4:
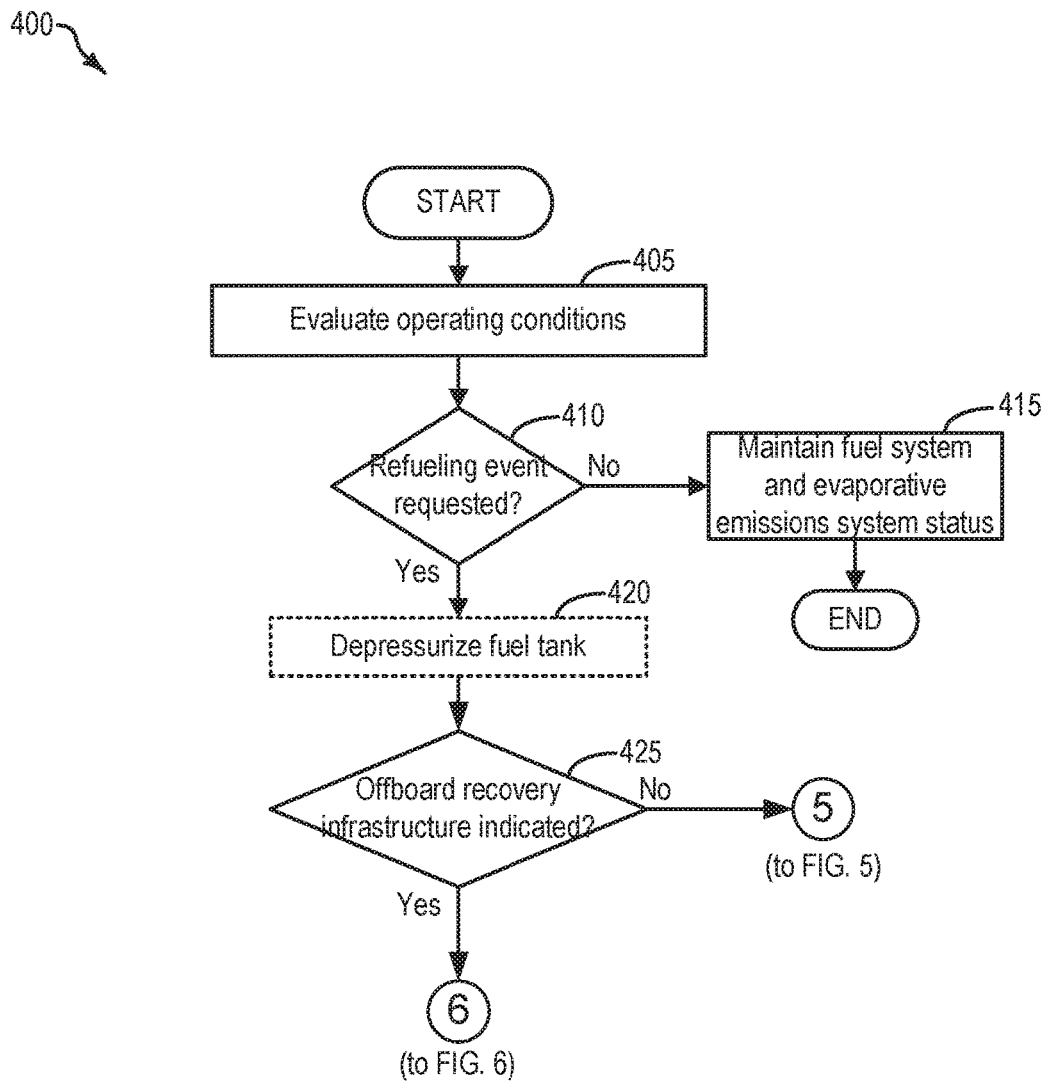
FIG. 4 shows a high level example method for indicating whether a vehicle with an onboard refueling vapor recovery (ORVR) system is attempting to refuel at a refueling station equipped with offboard fuel vapor recovery infrastructure.

In order to determine whether to route fuel vapors to an offboard fuel vapor recovery infrastructure, a vehicle may first determine whether the gas station the vehicle is attempting to refuel at is equipped with offboard fuel vapor recovery infrastructure. Thus, a method for indicating whether the vehicle is positioned at a gas station with offboard fuel vapor recovery infrastructure, is illustrated in FIG. 4. If an ORVR vehicle is indicated to be attempting to refuel at a gas station that is not equipped with offboard fuel vapor recovery infrastructure, then the vehicle may be refueled according to the method depicted in FIG. 5, which may include routing fuel vapors to the fuel vapor canister. Alternatively, if an ORVR vehicle is indicated to be attempting to refuel at a gas station that is equipped with offboard fuel vapor recovery infrastructure, then the vehicle may be refueled according to the method depicted in FIG. 6, which may include routing fuel vapors to the offboard fuel vapor recovery infrastructure.

Figure 7:
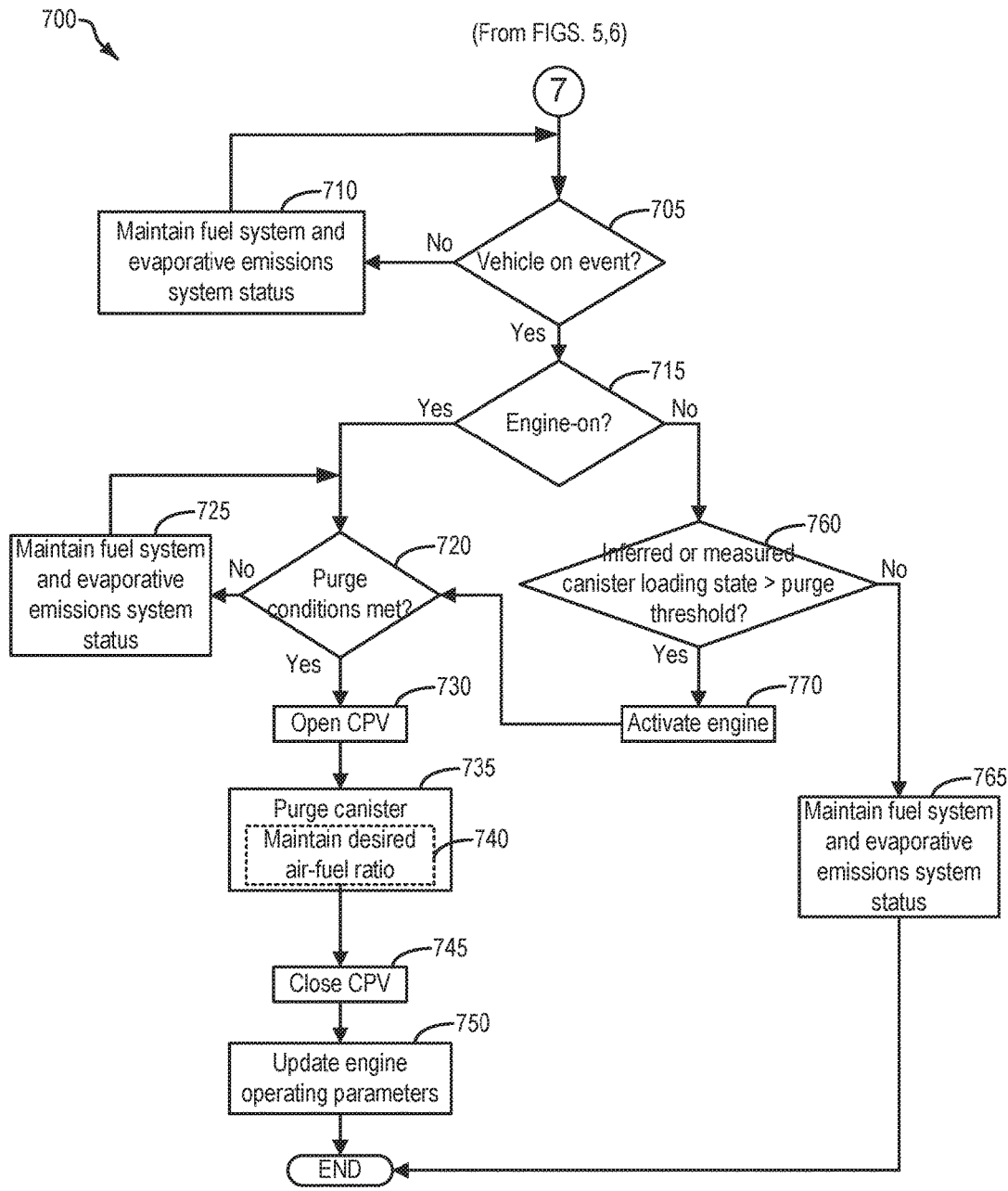
FIG. 7 shows a high level example method for conducting a purging operation of a fuel vapor canister.
Figure 8:
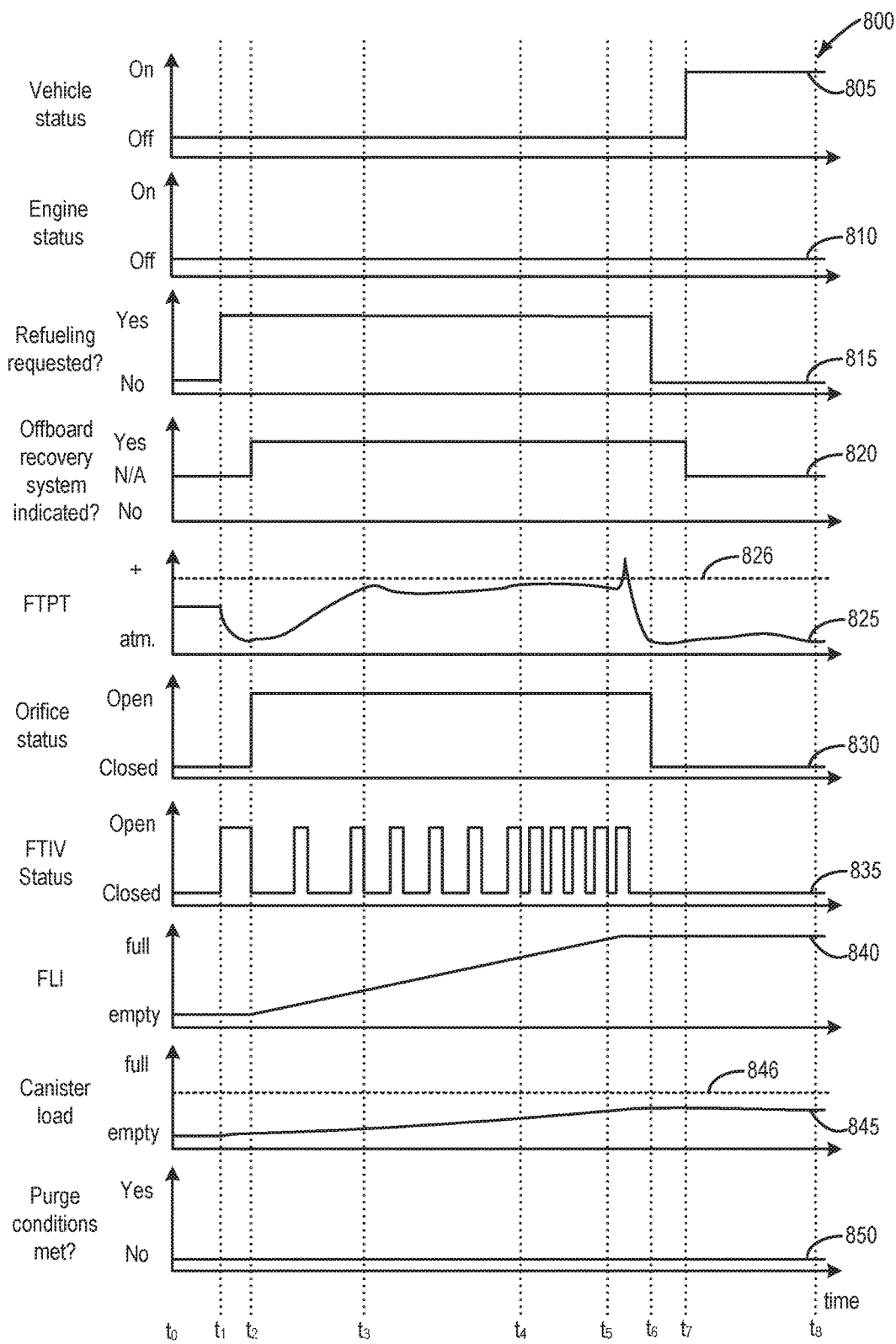
FIG. 8 shows an example timeline for conducting a refueling event of an ORVR vehicle, according to the methods of FIGS. 4-7.

Subsequent to refueling an ORVR vehicle, depending on a canister loading state, the fuel vapor canister may be purged. Such a method for purging the fuel vapor canister is illustrated in FIG. 7. An example timeline for conducting a refueling operation of an ORVR vehicle, according to the methods of FIGS. 4-7, is illustrated in FIG. 8.

Figure 1:
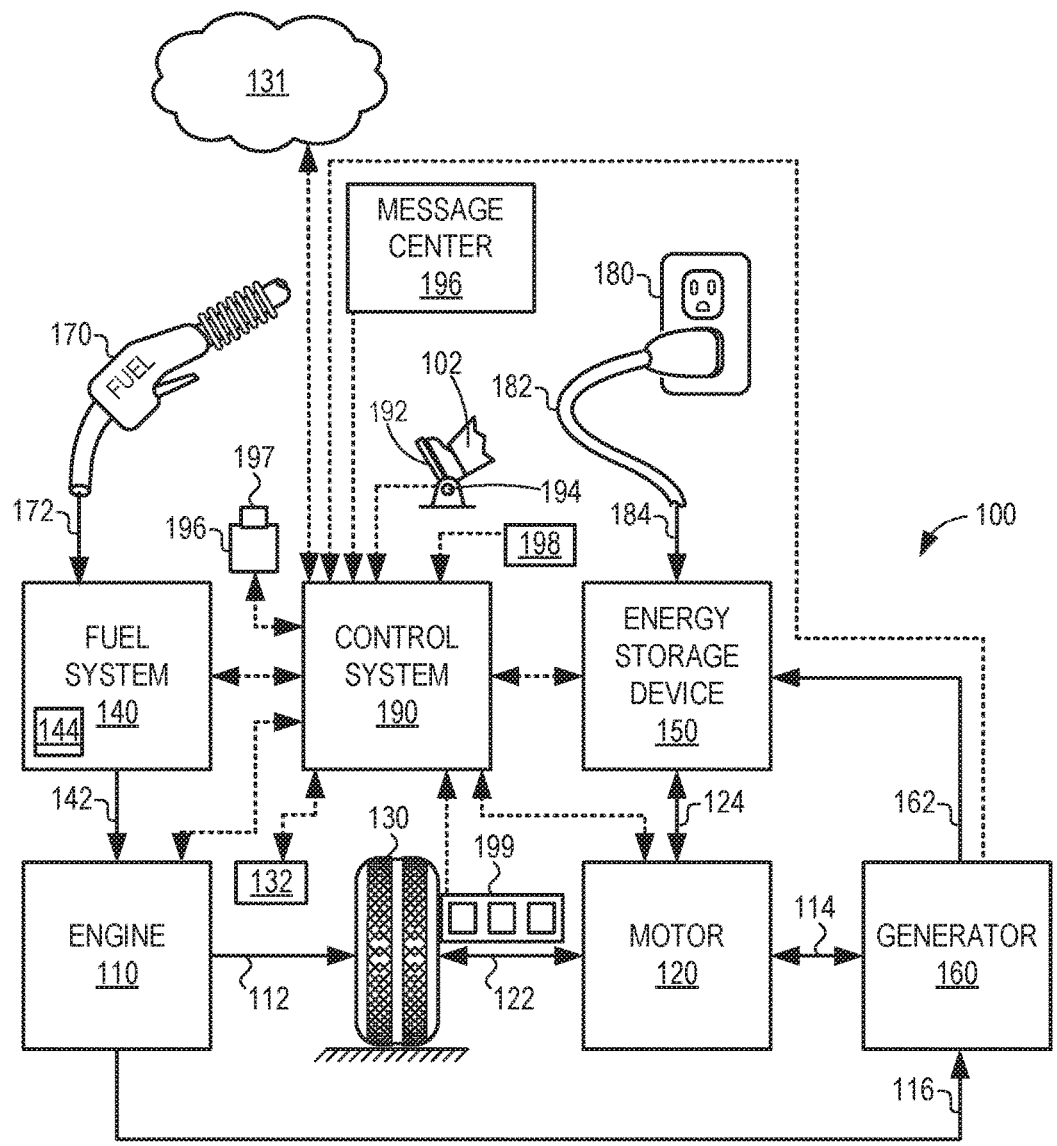
FIG. 1 schematically shows an example vehicle propulsion system.
Figure 2:
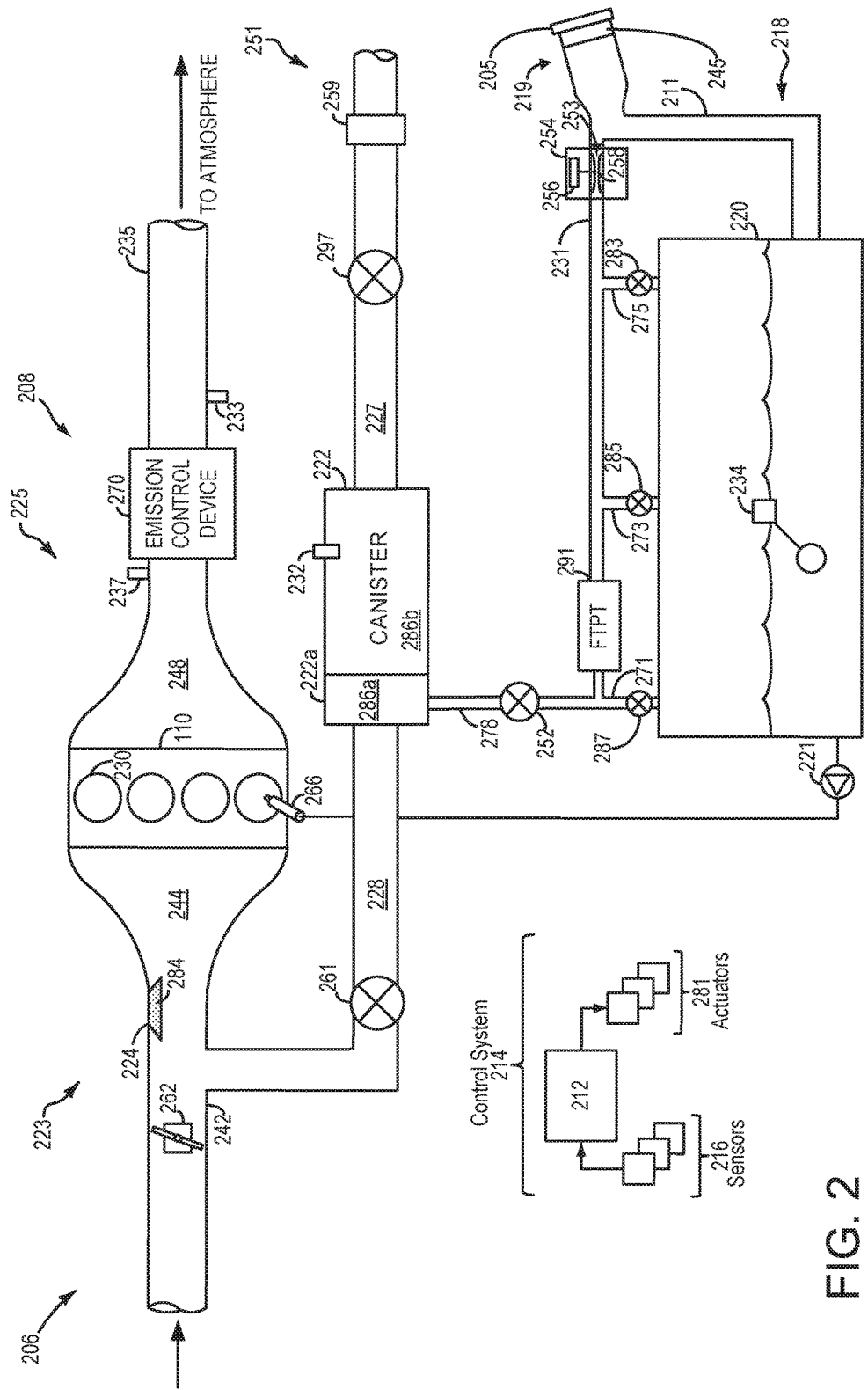
FIG. 2 schematically shows an example vehicle system comprising an engine system coupled to a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art. As will be described in further detail below, data communication between a vehicle and an infrastructure (e.g. gas station) may be utilized to indicate that the vehicle is located at a gas station that includes offboard vapor recovery infrastructure (e.g. underground storage tank). Responsive to an indication that the vehicle is located at a gas station that includes offboard vapor recovery infrastructure, and where the vehicle includes a vehicle with onboard refueling vapor recovery (ORVR), operating parameters may be adjusted by the vehicle controller such that fuel vapors generated during refueling the vehicle are routed to the offboard vapor recovery infrastructure, rather than being routed to a fuel vapor canister. In this way, loading of the fuel vapor canister with fuel vapors generated during a refueling event may be reduced.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In one example, information received from the GPS may be cross-referenced to information available via the internet to indicate that the vehicle is located at a gas station, where it may further be indicated that the gas station includes offboard vapor recovery infrastructure. In such an example, as discussed above and which will be discussed in further detail below, vehicle operating parameters may be adjusted such to route vapors to the offboard vapor recovery infrastructure, instead of to the fuel vapor canister. In still other examples, control system 190 may use the internet to obtain updated software modules which may be stored in non-transitory memory.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst(s) 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the engine air intake 223. For example, hydrocarbon trap 224 may be positioned in the air box (not shown) or in the engine intake manifold 244 of engine 110 to adsorb fuel vapors emanating from unburned fuel in the intake manifold, puddled fuel from injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material 284 may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the engine air intake 223 even when engine 110 is shut down and stopped rotating.

Fuel system 218 may include a fuel tank 220 coupled to a fuel pump system 221. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

The fuel vapor recovery line 231 and/or the fuel vapor storage line 278 may be configured to hold a percentage of total fuel vapor generated during a refueling event. For example, the vapor recirculation line 231 and/or fuel vapor storage line 278 may in some examples be configured to hold approximately 20% of the total fuel vapor generated during a refueling event. However, in other examples, the recirculation line 231 and/or storage line 278 may be configured to hold more or less than 20% of the total fuel vapors generated in the fuel tank 220. By effectively increasing the vapor dome volume of the fuel tank 220, the recirculation line 231 may limit the rate of flow of fuel vapors to the fuel vapor canister 222. Depending on the configuration of the fuel dispenser and gas station infrastructure, a portion of the fuel vapor held within the recirculation line 231 may be returned to the fuel dispenser, discussed in detail below.

Recirculation line 231 may include a variable orifice valve 254. Variable orifice valve 254 may also be referred to herein as continuously variable recirculation valve 254. The variable orifice valve 254 may include a flow restriction 258, which may be a diaphragm, ball, plunger, etc., which restricts flow through the valve 254. Thus, an orifice 253 may be formed by the flow restriction 258, where the size of the orifice 253 may be adjusted by adjusting the flow restriction 258. Specifically, adjusting the flow restriction 258 to a more open position may increase the size of the orifice 253, and thereby may increase an amount of gasses flowing through the valve 254. Conversely, adjusting the flow restriction 258 to a more closed position may decrease the size of the orifice 253, thereby decreasing an amount of gasses flowing through the valve 254. In the description herein, closing the valve 254 comprises adjusting the flow restriction 258 to a more closed position. Similarly, opening the valve 254 comprises adjusting the flow restriction 258 to a more open position. In some examples, the valve 254 may include only one orifice. However, in other examples, the valve 254 may include more than one orifice, where the size of each orifice may be adjustable.

A position of the flow restriction 258 may be adjusted by an actuator 256 of valve 254. The actuator may be an electromechanical actuator. However in other embodiments, the actuator may be hydraulic or pneumatic. In some examples the actuator 256 may be included within the valve 254. However, in other examples, the actuator 256 may be external to the valve 254, but may be physically coupled to the valve 254. The actuator 256 may be mechanically coupled to the flow restriction 258, for adjusting the position of the flow restriction 258, and therefore the size of the orifice 253. Thus, actuator 256 may be an electric motor comprising a solenoid and armature assembly for generating rotational motion from electrical input. Further, the actuator 256 may be in electrical communication with the controller 212. Based on signals received from the controller 212, the actuator 256 may adjust the position of the flow restriction 258 to adjust the size of the orifice 253. Said another way, the controller 212 may send signals to the actuator 256 to adjust the size of the orifice 253 by adjusting the position of the flow restriction 258.

By adjusting the size of the orifice 253, an amount of air and/or fuel vapors flowing through recirculation line 231 may be adjusted. An example method for adjusting flow through the recirculation line 231 is shown below with reference to FIGS. 5-6. Briefly, responsive to an indication that a vehicle comprising an ORVR system is requesting refueling at a gas station with offboard fuel vapor recovery infrastructure, the variable orifice valve 254 may be commanded by the controller 212 to a fully (e.g. 100%) open state, such that vapors generated during refueling may be directed to the offboard storage infrastructure.

Refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not combusting air and fuel), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

However, as discussed above and which will be further discussed below, in some examples a vehicle with an ORVR system including a fuel vapor canister may be refueled at a gas station configured with offboard fuel vapor storage infrastructure. In such an example, if the FTIV 252 and canister vent valve (CVV) 297 are commanded open, to route fuel vapors generated during refueling to the fuel vapor canister, the canister may be unnecessarily loaded with fuel vapors, as it may be possible to route fuel vapors to the offboard fuel vapor storage infrastructure. As such, in an example where a vehicle configured with an ORVR system requests refueling at a gas station indicated to have offboard fuel vapor storage infrastructure, rather than commanding open the FTIV and CVV to route fuel vapors to the canister 222, another method may be utilized. Briefly, variable orifice valve 254 may be commanded to a fully open (e.g. 100% open) state, and either the FTIV 252 (if the vehicle is equipped with an FTIV), or the CVV 297, may be duty cycled at a predetermined rate. The predetermined rate may be a rate that may ensure that a majority of the fuel vapors are directed to the offboard storage infrastructure, rather than being routed to the fuel vapor canister. In such an example, fuel tank pressure may be monitored via fuel tank pressure transducer (FTPT) 291. The duty cycle of the FTIV or CVV may be adjusted based on the fuel tank pressure, in order to prevent premature shutoffs of the refueling pump from occurring, and/or to encourage fuel vapors to be routed to the offboard storage infrastructure. More specifically, during refueling the vehicle, where the controller sends a command to the variable orifice valve 254 to fully open, and where the FTIV or CVV are commanded by the controller to be duty cycled at a predetermined rate, the duty cycle may be adjusted by the controller responsive to indications of fuel tank pressure. As one example, if fuel tank pressure is low (e.g. below 5-8 InH2O), the duty cycle of the FTIV or CVV may be decreased, such that fuel vapors may be encouraged to travel to the offboard storage infrastructure, via the open variable orifice valve 254. Alternatively, in another example, if fuel tank pressure is high (e.g. above 10 InH2O), the duty cycle of the FTIV or CVV may be increased, such that fuel tank pressure may be relieved. By adjusting the duty cycle of the FTIV (if the vehicle is equipped) or CVV during refueling, and where the variable orifice valve 254 is commanded to be fully open, fuel vapors may be effectively routed to the offboard storage infrastructure, rather than to the fuel vapor canister 222. In this way, loading of the fuel vapor canister 222 may be reduced.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252. Herein, the vacuum generated by the intake manifold of the operating engine may be used to draw fresh air through vent 27 and through fuel vapor canister 222 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, variable orifice valve 254, and canister vent valve 297. The control system 214 may include a controller 212. The controller may receive input data from the various sensors, process the input data, and trigger the actuators in response to the processed input data based on instruction or code programmed therein corresponding to one or more routines. An example control routine is described herein with regard to FIGS. 4-7.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Figure 3:
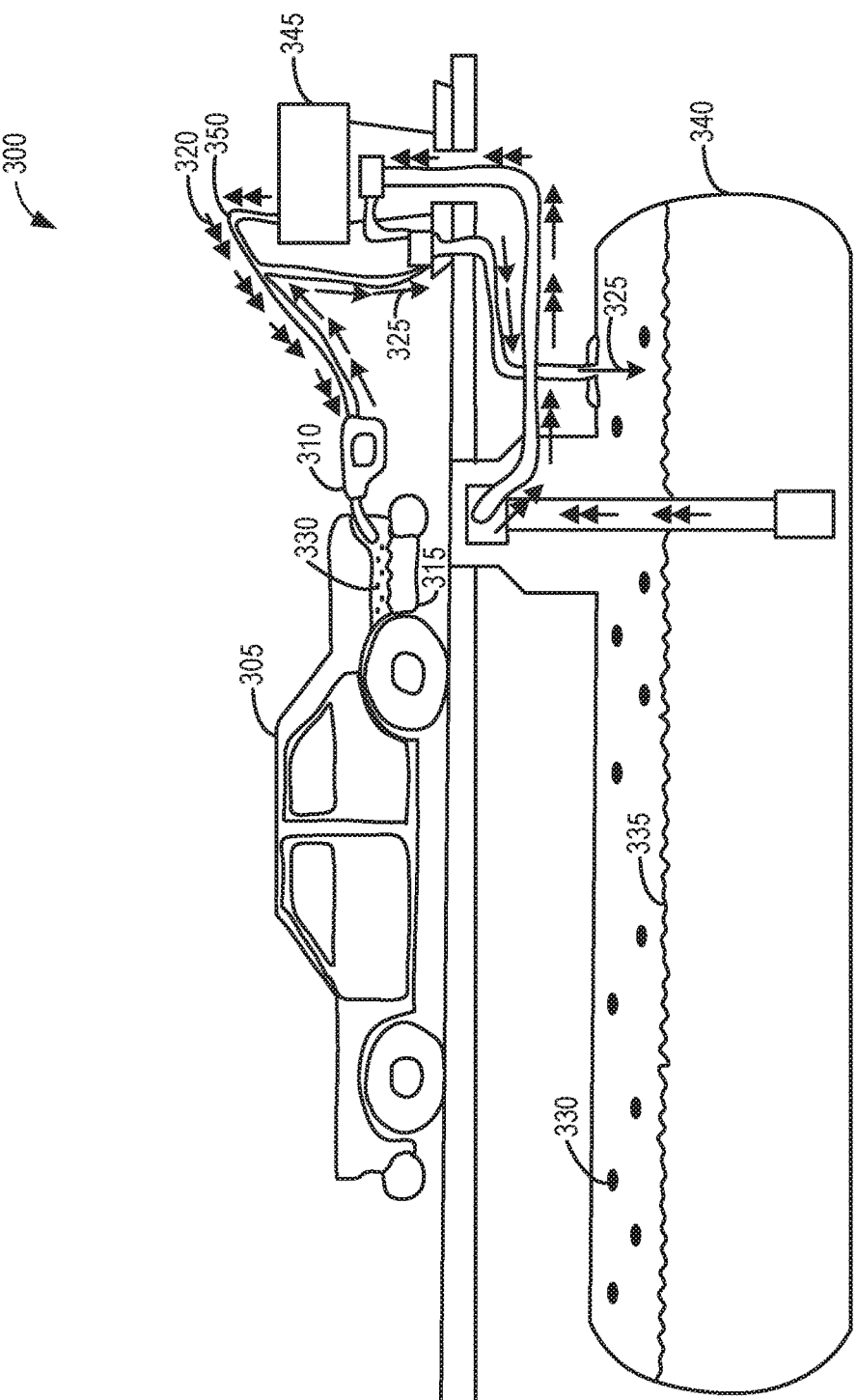
FIG. 3 shows an illustration of an offboard fuel vapor recovery infrastructure.

Turning to FIG. 3, an example illustration depicting offboard fuel vapor recovery 300, is shown. More specifically, FIG. 3 depicts a typical offboard fuel vapor storage infrastructure, for which fuel vapors generated during refueling of non-ORVR vehicles may be routed to the offboard storage infrastructure, thus reducing undesired evaporative emissions. As discussed above and which will be discussed further below, by controlling the routing of fuel vapors during refueling of an ORVR vehicle, an ORVR vehicle may be refueled at a gas station that includes offboard fuel vapor storage infrastructure, in a way that limits an amount of canister loading under such circumstances.

In a typical refueling event comprising offboard fuel vapor recovery, a vehicle 305 including a fuel tank 315 may be refueled via a dispenser 310. While not explicitly illustrated, it may be understood that refueling dispenser 310 may include a refueling nozzle with a boot configured to seal around a fuel filler neck (e.g. 211). During refueling, fuel 335 may be drawn from a storage tank 340 and delivered to the vehicle fuel tank 315. The drawing of fuel from the storage tank 340 and into the vehicle fuel tank 315, is illustrated schematically via double-headed arrows 320. Briefly, fuel may be drawn from the storage tank 340, through filling station 345, and into the vehicle fuel tank 315, as depicted by double-headed arrows 320. Vapors 330 generated in the fuel tank during refueling may be routed back to the storage tank 340, as illustrated by single-headed arrows 325. It may be understood that fuel may travel in one direction from the storage tank 340 to the fuel tank 315, while fuel vapors may travel in another direction from the vehicle fuel tank 315 to the storage tank 340 via a coaxial dispenser 310 and coaxial hose 350.

However, there may be instances where an ORVR vehicle refuels at a gas station with offboard vapor recovery infrastructure. In such an example, rather than loading the canister with fuel vapors, fuel vapors may be actively routed to the storage tank 340. As discussed above, actively routing fuel vapors from an ORVR vehicle to an underground storage tank may include commanding open a variable orifice valve (e.g. 254), and duty cycling a FTIV (e.g. 252) or CVV (e.g. 297). By reducing loading of the fuel vapor canister under such conditions, undesired evaporative emissions resulting from a loaded fuel vapor canister may be reduced.

More specifically, during refueling of a vehicle equipped with onboard refueling vapor recovery, where the onboard refueling vapor recovery includes a fuel vapor canister positioned in an evaporative emissions system, the fuel vapor canister removably coupled to a fuel tank positioned in a fuel system and configured to capture and store fuel vapors generated during refueling of the tank; fuel vapors generated during refueling may be routed primarily to an offboard fuel vapor recovery infrastructure and not to the fuel vapor canister responsive to an indication that a gas station where the vehicle is attempting to refuel is equipped with offboard fuel vapor recovery infrastructure. In another example, fuel vapors generated during refueling may be routed primarily to the fuel vapor canister, responsive to an indication that a gas station where the vehicle is attempting to refuel is not equipped with offboard fuel vapor recovery infrastructure.

As discussed, flow of air and fuel vapors from the fuel tank to the fuel vapor canister may be controlled by controlling a fuel tank isolation valve positioned between the fuel tank and the fuel vapor canister (or via a canister vent valve positioned between the fuel vapor canister and atmosphere). Furthermore, flow of air and fuel vapors from the fuel tank to the offboard fuel vapor recovery infrastructure may be controlled via a variable orifice valve positioned in a fuel vapor recirculation line, the fuel vapor recirculation line connecting the fuel tank to a fuel filler neck of the fuel tank. As such, actively routing fuel vapors generated during refueling primarily to the fuel vapor canister may include commanding open the fuel tank isolation valve (and/or canister vent valve) and commanding the variable orifice valve to restrict an orifice size of the variable orifice valve to a predetermined orifice size. Alternatively, actively routing fuel vapors generated during refueling primarily to the offboard fuel vapor recovery infrastructure may include duty cycling the fuel tank isolation valve (or canister vent valve) at a predetermined duty cycle rate, and commanding open the variable orifice valve.

Turning now to FIG. 4, a high level example method 400 for indicating whether a vehicle refueling event is being conducted at a gas station that includes offboard fuel vapor recovery infrastructure, is shown. More specifically, a vehicle equipped with an onboard refueling vapor recovery (ORVR) system may in some examples be refueled at a gas station that includes offboard fuel vapor recovery infrastructure. In such an example, it may be communicated to the vehicle controller that the gas station includes offboard fuel vapor recovery infrastructure, such that the fuel vapors generated during refueling the ORVR vehicle may be routed to the offboard fuel vapor storage infrastructure, thus reducing routing of the refueling vapors to a fuel vapor canister onboard the ORVR vehicle. Said another way, a rate of routing of fuel vapors to the fuel vapor canister may be adjusted responsive to an indication of a vehicle offboard fuel vapor recovery infrastructure at the gas station where the vehicle is attempting to refuel. For example, adjusting the rate of routing fuel vapors from the fuel tank to the fuel vapor canister includes decreasing the rate of routing fuel vapors from the fuel tank to the fuel vapor canister responsive to the indication of the offboard fuel vapor recovery infrastructure, as compared to a condition where offboard fuel vapor recovery infrastructure is not indicated.

As an example, in a first condition, fuel vapors generated during refueling may be routed during refueling primarily to the fuel vapor storage canister, and in a second condition, fuel vapors generated during refueling may be routed primarily to an offboard fuel vapor recovery infrastructure. More specifically, fuel vapors generated during refueling may be routed primarily to the fuel vapor storage canister, according to the first condition, responsive to the indicated absence of offboard fuel vapor recovery. Alternatively, fuel vapors generated during refueling may be routed primarily to the offboard fuel vapor recovery infrastructure, according to the second condition, responsive to the indicated presence of offboard fuel vapor recovery infrastructure.

Furthermore, at least a portion of fuel vapors from the fuel tank may be recirculated into a recirculation line during refueling, the recirculation line coupling the fuel tank to a fuel filler neck of the fuel tank. As such, adjusting the rate of routing fuel vapors from the fuel tank to the fuel vapor canister may include increasing a rate at which fuel vapors are routed through the recirculation line and to the fuel filler neck, as compared to a condition where offboard fuel vapor recovery infrastructure is not indicated. In such an example, adjusting the rate of routing fuel vapors from the fuel tank to the fuel vapor canister may be accomplished at least in part by commanding open a variable orifice valve positioned in the recirculation line.

Method 400 will be described with reference to the systems described herein and shown in FIGS. 1-3, though it should be understood that similar methods may be applied to other systems without departing from the scope of this disclosure. Method 400 may be carried out by a controller, such as controller 212 in FIG. 2, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIG. 1 and FIG. 2. The controller may transform operating states of the fuel system, and evaporative emissions system via actuators, such as CPV (e.g., 261), fuel tank isolation valve (FTIV) (e.g., 252), canister vent valve (CVV) (e.g., 297), refueling lock (e.g., 245), variable orifice valve 254, etc., according to the methods below.

Method 400 begins at 405 and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 410, method 400 may include indicating whether a refueling event is requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. Such examples are in no way meant to be limiting, and a refueling request may be indicated via any manner known in the art. If, at 410, a request for refueling is not indicated, method 400 may proceed to 415, and may include maintaining the vehicle fuel system and evaporative emissions status. For example, components such as the FTIV, CVV, CPV, and refueling lock may be signaled by the controller to maintain their current conformation and/or activity. Method 400 may then end.

Returning to 410, if a request for refueling is indicated, method 400 may proceed to 420. At 420, method 400 may include depressurizing the fuel tank. For example, the controller (e.g., 212) may open FTIV (e.g., 252) and open or maintain open a vent path between the fuel vapor canister and atmosphere (e.g., open CVV), while maintaining the CPV (e.g., 261) closed, to depressurize the fuel tank before allowing enabling fuel to be added therein. The FTIV may be opened in a manner to depressurize the fuel tank at a predetermined rate, so as to prevent rapid depressurization. For example, FLVV (e.g. 285) and GVV (e.g. 283) may cork shut responsive to rapid depressurization. By commanding open the FTIV, the fuel tank may be selectively coupled to adsorbent material contained in a fuel vapor canister positioned in an evaporative emissions system of the vehicle. A refueling lock (e.g., 245), may be maintained locked until the fuel tank pressure decreases to a threshold pressure (e.g., atmospheric pressure), and then commanded to unlock, thus allowing access to the fuel filler neck only following fuel tank depressurization.

Step 420 is illustrated as a dashed box in order to indicate that step 420 may not be carried out in a vehicle that does not include a FTIV. In such an example where a vehicle does not include an FTIV, the CVV (e.g. 297) may be typically maintained open, except for during test diagnostic procedures to identify the presence or absence of undesired evaporative emissions. Thus, in an example where a vehicle is not equipped with an FTIV, the fuel tank may typically be at or near atmospheric pressure, and thus a depressurization procedure prior to refueling may not be conducted.

Proceeding to 425, method 400 may include indicating whether offboard vapor recovery infrastructure is indicated at the gas station the vehicle is attempting to refuel at. As discussed above, the vehicle may be equipped with an ability to identify whether a particular gas station is configured with offboard vapor recovery infrastructure. As one example, the vehicle controller (e.g. 212) may be capable of communicatively coupling to a gas station's computer system or network, via a wireless network (e.g. 131). In such an example, the vehicle controller may send a signal to the gas station the vehicle is located at, requesting information as to whether the gas station includes offboard vapor recovery infrastructure. Such a signal may be received and processed by the gas station's computational architecture, and the requested information sent back to the vehicle controller. Upon receiving the requested information, the vehicle controller may indicate whether the gas station comprises a gas station with offboard vapor recovery infrastructure.

In another example, the vehicle controller may be communicatively coupled to the gas station via the internet, such that the vehicle may query the gas station as to whether the gas station the vehicle is positioned at includes offboard vapor recovery infrastructure. In such an example, a website for a particular gas station may be configured to provide information pertaining to whether the gas station includes offboard vapor recovery infrastructure, responsive to a request initiated by the vehicle controller (e.g. 212).

In some examples, a vehicle GPS or other onboard navigation system may be utilized in order to determine vehicle location, and based on the indicated vehicle location, a request as to whether a particular gas station may be configured with offboard fuel vapor recovery, may be initiated. More specifically, a vehicle location may be indicated via GPS or other onboard navigation system, and may be communicated to the controller. Responsive to the vehicle location determination, the controller may query the internet in order to retrieve information about a gas station positioned at a location that closely matches the indicated GPS location of the vehicle. For example, based on the GPS coordinates, the vehicle controller may first determine the particular gas station the vehicle is positioned at. Next, responsive to determining the gas station identity, the controller may query the internet as to whether that particular gas station is equipped with offboard fuel vapor recovery infrastructure. Such information may be included in a website associated with the particular gas station, for example, and may be communicated back to the vehicle controller.

It may be understood that the above examples are illustrative, and are not meant to be limiting. For example, any known means of retrieving information pertaining to whether a particular gas station includes offboard fuel vapor recovery infrastructure may be utilized without departing from the scope of this disclosure. Thus, at 425, method 400 may include sending a wireless request for information as to whether the gas station where the refueling is occurring is equipped with offboard fuel vapor recovery infrastructure; receiving a wireless response; and indicating whether the gas station is equipped with offboard fuel vapor recovery infrastructure based on the receiving of the wireless response.

Figure 5:
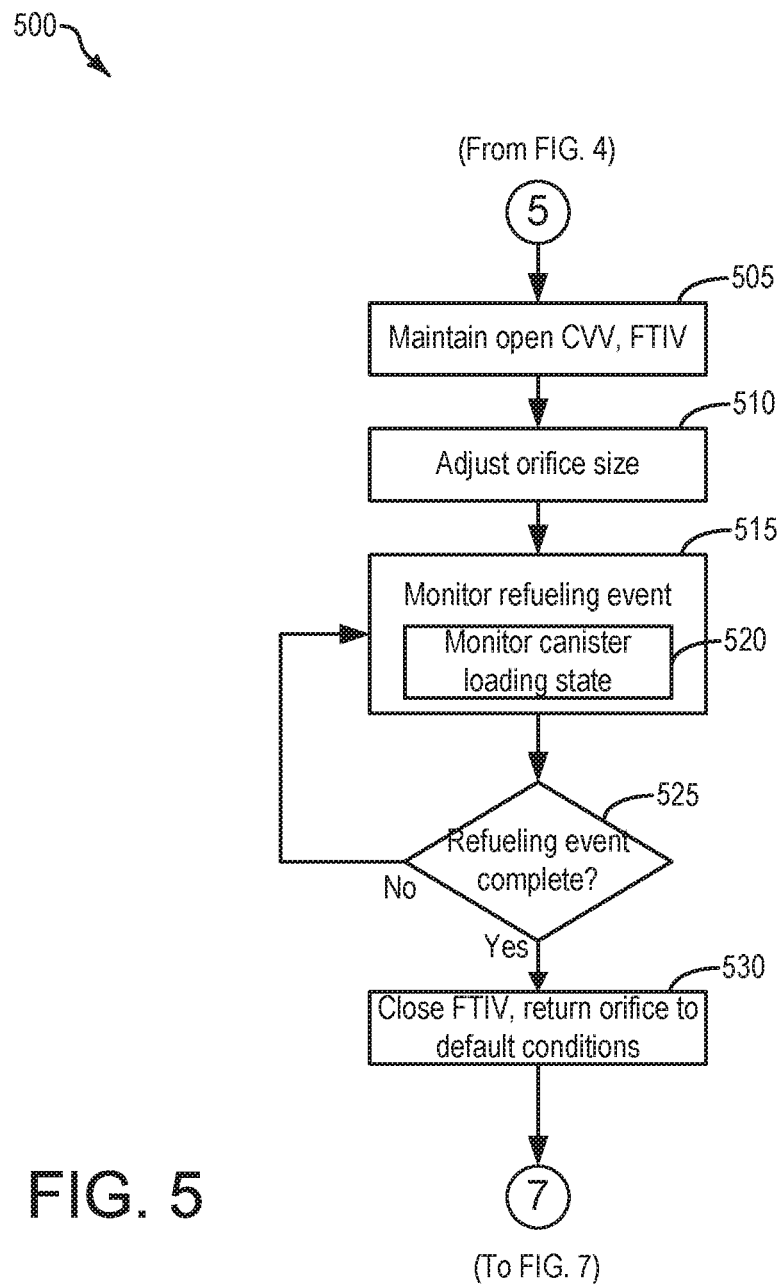
FIG. 5 shows a high level example method for conducting a refueling operation of an ORVR vehicle at a refueling station that is not equipped with offboard fuel vapor recovery infrastructure.

If, at 425 it is indicated that the gas station the vehicle is positioned at does not include offboard fuel vapor recovery infrastructure, method 400 may proceed to method 500 depicted at FIG. 5. Alternatively, if it is indicated that the gas station the vehicle is positioned at includes offboard fuel vapor recovery infrastructure, method 400 may proceed to method 600 depicted at FIG. 6.

Turning to FIG. 5, a high level example method 500 for conducting a refueling event for an ORVR vehicle, is shown. More specifically, method 500 may continue from method 400, and may include, responsive to determining that a gas station the vehicle is positioned at for conducting the refueling event does not include offboard fuel vapor storage infrastructure, conducting the refueling operation by routing a majority of the refueling vapors to an onboard fuel vapor canister.

Method 500 will be described with reference to the systems described herein and shown in FIGS. 1-3, though it should be understood that similar methods may be applied to other systems without departing from the scope of this disclosure. Method 500 continues from method 400, and as such, method 500 may be carried out by a controller, such as controller 212 in FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIG. 1 and FIG. 2. The controller may transform operating states of the fuel system, and evaporative emissions system via actuators, such as CPV (e.g., 261), fuel tank isolation valve (FTIV) (e.g., 252), canister vent valve (CVV) (e.g., 297), refueling lock (e.g., 245), variable orifice valve 254, etc., according to the methods below.

Method 500 begins at 505 and may include maintaining open the CVV, and maintaining open the FTIV (if included). As the vehicle is indicated to be refueling at a gas station that does not include offboard fuel vapor recovery infrastructure, by maintaining open the CVV and FTIV during refueling, most of the fuel vapors may be directed to the fuel vapor canister (e.g. 222), where they may be captured and stored prior to exiting to atmosphere. More specifically, at 505, Method 500 may include maintaining open the CVV (and FTIV), without duty cycling either the CVV or FTIV (where included).

Continuing to 510, method 500 may include adjusting an orifice size (e.g. 253) of a variable orifice valve (e.g. 254) positioned in a recirculation line (e.g. 231). In some examples, adjusting an orifice size of variable orifice valve may include commanding the valve to adjust orifice size to a predetermined orifice size. For example, the predetermined orifice size may comprise an orifice size determined to be optimal for conducting a refueling event where the gas station does not include offboard fuel vapor storage infrastructure. More specifically, the predetermined orifice size may comprise an orifice size determined to result in a desired amount of fuel vapor recirculation, while directing the rest of the refueling vapors to the fuel vapor canister. Such a predetermined orifice size may in some examples be set based on a size and loading capacity of the fuel vapor canister (e.g. 222). For example, a canister may be designed to adsorb a determined amount of refueling vapors. The predetermined orifice size may thus define an amount of refueling vapors that are recirculated, as compared to an amount routed to the fuel vapor canister, such that the fuel vapor canister is prevented from becoming saturated with refueling vapors. By adjusting the orifice size (e.g. 253) of variable orifice valve (e.g. 254) to the predetermined orifice size, the fuel system and evaporative emissions system of the vehicle may be optimally configured for conducting a refueling procedure where the ORVR vehicle is being refueled at a gas station that is not set up for offboard fuel vapor recovery.

Proceeding to 515, method 500 may include monitoring the refueling event. For example, monitoring the refueling event at 515 may include monitoring fuel level via a fuel tank fill level sensor (e.g. 234), and may further include monitoring fuel tank pressure (FTP) via one or more fuel tank pressure transducer (e.g. 291), for the duration of the refueling event. Monitoring FTP may include receiving signals from one or more fuel tank pressure sensors continuously, or at predetermined time intervals such that a predetermined number of fuel tank pressure measurements can be performed over the duration of the refueling event. The predetermined number of fuel tank pressure measurements and the predetermined time intervals may be set depending on a noise characteristic of the sensor and/or fuel tank pressure signal, for example. In one example, the predetermined time interval may be 5 seconds or 10 seconds, or frequent enough to collect a reliable number of pressure measurements representative of the FTP dynamics typically observed during refueling. As another example, the predetermined time interval or predetermined number of fuel tank pressure measurements may be set large enough to reliably measure a rate of change in fuel tank pressure due to a refueling event. Similarly, monitoring fuel level may include the control system receiving information regarding the level of fuel stored in the fuel tank via one or more fuel level sensors, either continuously or at predetermined intervals over the duration of the refueling event.

As discussed above, one or more temperature sensors (e.g. 232) may be coupled to and/or within the fuel vapor canister (e.g. 222). During a refueling event, as fuel vapors are adsorbed by the fuel vapor canister, heat may be generated. Accordingly, at 520, method 500 may further include monitoring a canister loading state via the one or more temperature sensors. Such information may be utilized subsequent to refueling, in order to update a fuel vapor canister purging schedule, for example.

Proceeding to 525, method 500 may include indicating whether the refueling event is complete. For example, completion of refueling at 525 may be indicated when the fuel level has plateaued for a predetermined duration of time. Indicating whether the refueling event is complete may further include an indication that a refueling nozzle has been removed from the fuel filler neck, replacement of a fuel cap, closing of a refueling door, etc. If, at 525 it is indicated that refueling is not complete, method 500 may return to 515, where the refueling event may be continued to be monitored. Alternatively, if, at 525, it is indicated that the refueling event is complete, method 500 may proceed to 530.

At 530, method 500 may include commanding closed the FTIV (where included). For example, the controller may send a signal to the FTIV actuating the FTIV closed. By commanding the FTIV closed, the fuel tank may be sealed from the evaporative emissions system. In this way, fuel vapors generated in the fuel tank may be contained within the tank, and may not be routed to the fuel vapor canister, thus preventing loading of the canister after the refueling event. In an example where the FTIV is not included, the CVV may be maintained open, such that fuel vapors may be directed to the fuel vapor canister for storage.

Furthermore, at 530, method 500 may include returning the variable orifice valve to default conditions. More specifically, the controller may send a signal to the variable orifice valve commanding the variable orifice valve to a predetermined default orifice size. In some examples the predetermined default orifice size may comprise an orifice size the same as, or substantially similar to, the predetermined orifice size indicated above for conducting the refueling operation. In other words, at 530, if the predetermined default orifice size is the same as the predetermined orifice size for conducting a refueling event, then the valve may not be adjusted at 530. Alternatively, in other examples, the predetermined default orifice size may comprise an orifice size different than the predetermined orifice size utilized for conducting the refueling event. For example, the predetermined default orifice size may be smaller than the predetermined orifice size utilized for conducting the refueling event. In some examples, the predetermined default orifice size may comprise a closed, or substantially closed orifice. In still other examples, the predetermined default orifice size may comprise an orifice size larger than the predetermined orifice size utilized during the refueling event.

Responsive to completion of the refueling event, closing of the FTIV (where included), and returning (or maintaining) the variable orifice valve to default conditions, method 500 may proceed to method 700, depicted at FIG. 7, and which will be discussed further below.

Figure 6:
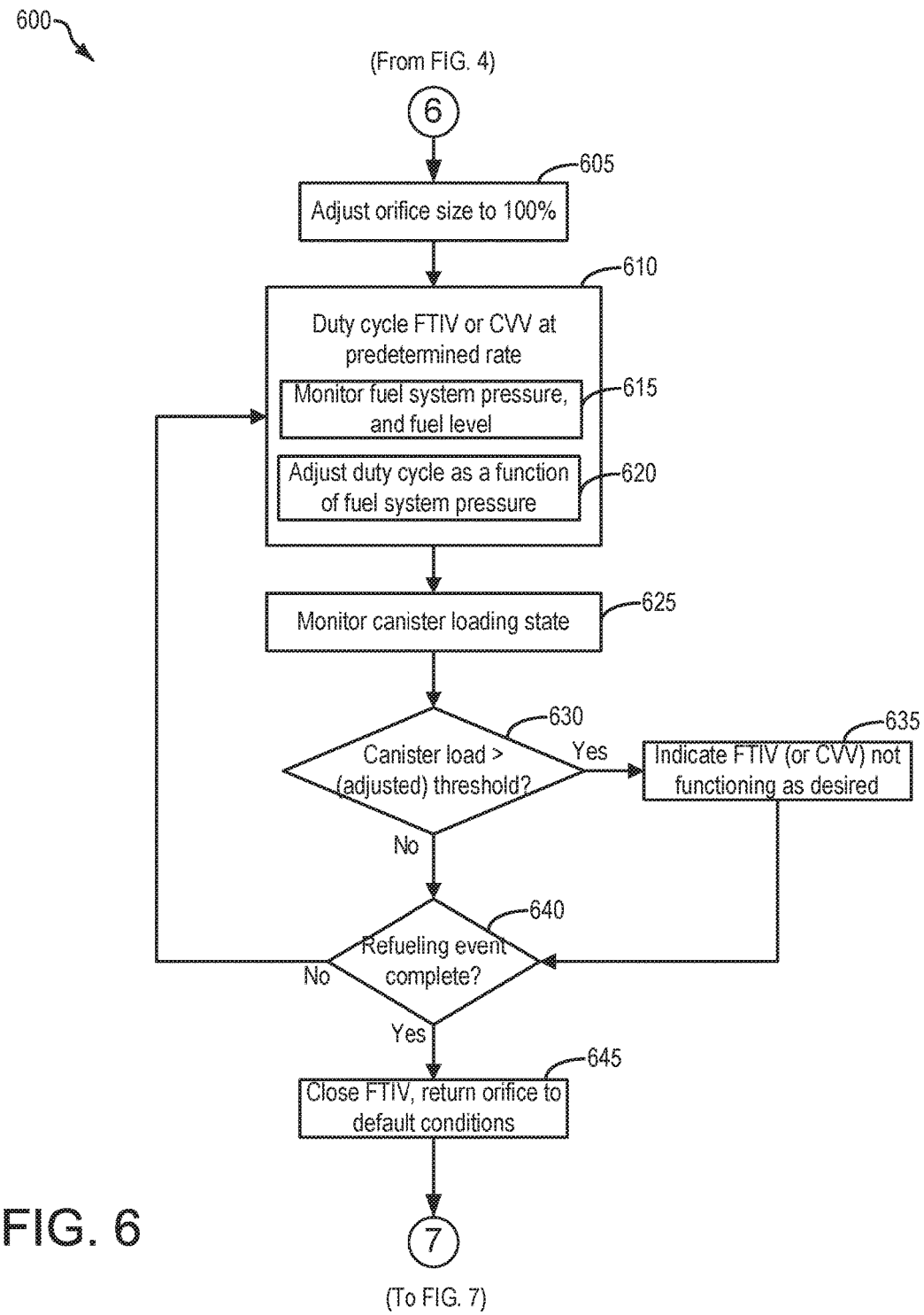
FIG. 6 shows a high level example method for conducting a refueling operation of an ORVR vehicle at a refueling station that is equipped with offboard fuel vapor recovery infrastructure.

Turning now to FIG. 6, a method 600 for refueling an ORVR vehicle at a gas station equipped with offboard fuel vapor recovery infrastructure, is shown. More specifically, method 600 may be used to, responsive to an indication that the ORVR vehicle is requesting refueling at a gas station equipped with offboard fuel vapor recovery infrastructure, actively route fuel vapors generated during the refueling event to an offboard storage tank. In this way, loading of a fuel vapor canister may be decreased when refueling at a gas station with offboard fuel vapor recovery infrastructure.

Method 600 will be described with reference to the systems described herein and shown in FIGS. 1-3, though it should be understood that similar methods may be applied to other systems without departing from the scope of this disclosure. Method 600 continues from method 400, and as such, method 600 may be carried out by a controller, such as controller 212 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIG. 1 and FIG. 2. The controller may transform operating states of the fuel system, and evaporative emissions system via actuators, such as CPV (e.g., 261), fuel tank isolation valve (FTIV) (e.g., 252), canister vent valve (CVV) (e.g., 297), refueling lock (e.g., 245), variable orifice valve 254, etc., according to the methods below.

Method 600 begins at 605 and may include adjusting the orifice size of a variable orifice valve positioned in a recirculation line (e.g. 231), to a fully open position. More specifically, the controller (e.g. 212) may send signals to an actuator (e.g. 256) to adjust the size of the orifice (e.g. 253) to be fully open (e.g. 100% open), by adjusting a position of a flow restriction (e.g. 258) of the variable orifice valve (e.g. 254). By adjusting the orifice size of the variable orifice valve to fully open, a non-restrictive path for fuel vapors from the tank, into the recirculation line, and through the variable orifice valve may be established. Adjusting the orifice size of the variable orifice valve to fully open, upon an indication that an ORVR vehicle is requesting refueling at a gas station with offboard fuel vapor recovery infrastructure, differs from an action that may be taken if an ORVR vehicle is requesting refueling from a gas station without offboard vapor recovery infrastructure. More specifically, as discussed above with regard to FIG. 5, upon indication that an ORVR vehicle is requesting refueling at a gas station without offboard vapor recovery infrastructure, the orifice size of the variable orifice valve may be adjusted to a predetermined orifice size, where the predetermined orifice size is not a fully open orifice. Said another way, the predetermined orifice size may comprise an orifice that is at least partially closed, in contrast to fully opening the orifice in the variable orifice valve when the vehicle is requesting refueling at a gas station equipped with offboard fuel vapor recovery infrastructure.

Continuing to 610, method 600 may include duty cycling the FTIV (if equipped), or duty cycling the CVV (if the vehicle is not equipped with an FTIV). For simplicity, in this example method, it may be understood that the vehicle is equipped with an FTIV, and thus the discussion will be based on a vehicle equipped with an FTIV. However, it may be understood that if a vehicle is not equipped with an FTIV, the CVV may be duty cycled in the same fashion as discussed below, without departing from the scope of this disclosure.

At 610, duty cycling the FTIV may include duty cycling the FTIV at a predetermined rate. As discussed above, the predetermined rate may be a rate that may ensure that a majority of the fuel vapors are directed to the offboard vapor recovery infrastructure, rather than being routed to the fuel vapor canister (e.g. 222). It may be understood that duty cycling the FTIV when the ORVR vehicle is being refueled at a gas station equipped with offboard vapor recovery infrastructure is different than an action taken when the ORVR vehicle is being refueled at a gas station without offboard vapor recovery infrastructure. More specifically, as discussed above at FIG. 5, the FTIV and CVV may be commanded open, and not duty cycled, during refueling the ORVR vehicle at a gas station without offboard vapor recovery infrastructure. In contrast, when an ORVR vehicle is being refueled at a gas station equipped with offboard vapor recovery infrastructure, the FTIV may be duty cycled at a predetermined rate. In some examples, the predetermined rate may comprise 10% duty cycle. In other examples, the predetermined rate may comprise a rate between 10% and 30% duty cycle. In still other examples, the predetermined rate may comprise a rate between 30% and 50%. Such examples are illustrative, and are not meant to be limiting. By duty cycling the FTIV (or CVV), a rate at which fuel vapors are routed to the fuel vapor canister may be adjusted, as described above and which will be further discussed below.

Continuing to 615, method 600 may include monitoring fuel system pressure and fuel tank fill level during the refueling event. For example, monitoring fuel system pressure may be conducted via one or more fuel tank pressure transducers (FTPT) (e.g. 291), and monitoring fuel level may be conducted via a fuel tank fill level sensor (e.g. 234). Monitoring fuel tank pressure may include receiving signals from one or more fuel tank pressure sensors continuously, or at predetermined time intervals such that a predetermined number of fuel tank pressure measurements can be performed over the duration of the refueling event. Similarly, monitoring fuel level may include the control system receiving information regarding the level of fuel stored in the fuel tank via one or more fuel level sensors, either continuously or at predetermined intervals over the duration of the refueling event.

Proceeding to 620, method 600 may include adjusting the duty cycle of the FTIV (or CVV if the vehicle is not equipped with an FTIV), as a function of fuel system pressure. More specifically, fuel system pressure may be monitored and the FTIV duty cycle may be adjusted to ensure that premature shutoff events of the refueling dispenser do not result responsive to duty cycling the FTIV and where the orifice of the variable orifice valve is fully open (e.g. 100% open). Said another way, when pressure in the fuel system reaches a predetermined value (e.g. 12 InH2O), a gas station fuel pump may be automatically triggered to shutoff. Accordingly, by monitoring fuel tank pressure via the FTPT, pressure in the fuel system may be maintained below the predetermined value where a shutoff of the fuel pump may occur, by actively controlling the duty cycle of the FTIV (or CVV). As an example, responsive to an indication of low fuel pressure (e.g. below 5 InH2O, or between 5 InH2O and 8 InH2O, the duty cycle of the FTIV may be decreased (below the predetermined duty cycle), such that fuel vapors generated during refueling may be encouraged to travel to the offboard fuel vapor recovery infrastructure, through the open variable orifice valve (e.g. 254), rather than being routed to the fuel vapor canister. However, if pressure builds in the fuel system to a level approaching the predetermine value (e.g. 12 InH2O) at which point a shutoff of the fuel pump may be triggered, the duty cycle of the FTIV (or CVV) may be increased, such that pressure in the fuel system may be relieved. In such an example, responsive to pressure in the fuel system decreasing, the FTIV duty cycle may again be adjusted such that a majority of fuel vapors are routed to the offboard vapor recovery infrastructure. In some examples, there may be a target fuel system pressure that is maintained via controlling the duty cycle of the FTIV. For example, the target fuel system pressure may comprise a fuel system pressure of 10 InH20. By maintaining fuel system pressure at 10 InH2O, premature shutoffs of the refueling pump may be avoided, while a majority of fuel vapors may be directed to the offboard fuel vapor. Such an example is illustrative, and is not meant to be limiting. For example, fuel system pressure may be maintained at 11 InH2O in some examples. In some examples, fuel system pressure may be maintained between 9 InH2O and 11.5 InH2O. By maintaining the FTIV closed as much as possible without a premature shutoff event occurring, loading of the fuel vapor canister may be minimized during the refueling event, while the majority of fuel vapors may be routed to the offboard fuel vapor recovery infrastructure. Thus, at 620, method 600 may include monitoring pressure in the fuel tank during refueling the fuel tank, where adjusting the rate of routing fuel vapors from the fuel tank to the fuel vapor storage canister may include adjusting the rate of routing fuel vapors from the fuel tank to the fuel vapor storage canister to prevent an automatic shutoff of a refueling dispenser providing fuel to the fuel tank. Furthermore, at 620, method 600 may include controlling flow of air an fuel vapor from the fuel tank to the fuel vapor canister by regulating a fuel tank isolation valve positioned in a conduit coupling the fuel tank to the fuel vapor storage canister, and wherein adjusting the rate of routing fuel vapors from the fuel tank to the fuel vapor canister is accomplished at least in part by duty cycling the fuel tank isolation valve. In another example, where the vehicle may not be equipped with a fuel tank isolation valve, at 620, method 600 may include controlling flow of air and fuel vapor from the fuel tank to the fuel vapor canister, and from the fuel vapor canister to atmosphere, by regulating a canister vent valve positioned in a fresh air line coupling the fuel vapor canister to atmosphere, and wherein adjusting the rate of routing fuel vapors from the fuel tank to the fuel vapor canister is accomplished at least in part by duty cycling the canister vent valve.

Proceeding to 625, method 600 may include monitoring a canister loading state during the refueling event. As discussed above, one or more temperature sensors (e.g. 232) may be coupled to and/or within the fuel vapor canister (e.g. 222). During the refueling event, as fuel vapors are adsorbed by the fuel vapor canister, heat may be generated. Thus, at 625, method 600 may include monitoring a canister loading state via the one or more temperature sensors. In some examples, monitoring a canister loading state during refueling an ORVR vehicle at a gas station equipped with offboard fuel vapor recovery infrastructure, may enable a determination as to whether a FTIV (or CVV) is not functioning as desired. For example, if fuel vapors are indicating to be loading the fuel vapor canister to a level greater than would be expected based on the duty cycle of the FTIV (or CVV), then it may be indicated that the FTIV (or CVV) are not functioning as desired.

Accordingly, proceeding to 630, method 600 may include indicating whether canister load is greater than a threshold canister load. In some examples, the threshold canister load may be adjusted based on the duty cycle of the FTIV (or CVV). More specifically, as the duty cycle of the FTIV (or CVV) is decreased, canister load may be expected to decrease. Alternatively, as the duty cycle of the FTIV (or CVV) is increased, canister load may be expected to increase. Thus, the controller may track the duty cycle and any adjustments to the duty cycle (as a function of fuel system pressure), and may thus adjust a threshold canister load accordingly. In this way, the adjusted threshold canister load may be related to the duty cycling of the FTIV (or CVV).

The adjusted threshold canister load may further be related to an amount of fuel added to the fuel tank, as indicated via the fuel level sensor. For example, as more fuel is added to the fuel tank, an amount of fuel vapors generated in the tank may be expected to increase. Thus, adjusting of a threshold canister load may include adjusting the threshold canister load taking into account the FTIV duty cycle, and an amount of fuel added to the fuel tank. Such information may be contained in a lookup table stored at the controller, for example. More specifically, based on an amount of fuel added to the tank, and an overall duty cycle of the FTIV (or CVV), a predicted canister loading state may be indicated via a lookup table, and such an indication may be used to adjust a canister load threshold.

Thus, in an example where the canister load is indicated to be above the adjusted canister load threshold, method 600 may proceed to 635 and may include indicating that the FTIV (or CVV) is not functioning as desired. For example, the indication may be stored at the controller. Additionally, in some examples a malfunction indicator light may be illuminated on a vehicle dash, alerting the vehicle operator of a need to service the vehicle.

Returning to 630, whether canister load is indicated to be below the adjusted threshold canister load, or above the threshold canister load, method 600 may proceed to 640. At 640, method 600 may include indicating whether the refueling event is complete. As discussed above, completion of refueling may be indicated when the fuel level has plateaued for a predetermined duration of time. Indicating whether the refueling event is complete may further include an indication that a refueling nozzle has been removed from the fuel filler neck, replacement of a fuel cap, closing of a refueling door, etc. If, at 640, it is indicated that the refueling event is not complete, method 600 may return to 610 and may include continuing to duty cycle the FTIV (or CVV) at the current duty cycle rate, continuing to monitor fuel system pressure and fuel tank fill level, and continuing to monitor canister loading state. Alternatively, if, at 640, it is indicated that the refueling event is complete, method 600 may proceed to 645.

At 645, method 600 may include commanding closed the FTIV (where included). As discussed above, the controller may send a signal to the FTIV actuating the FTIV closed. By commanding the FTIV closed, the fuel tank may be sealed from the evaporative emissions system. In this way, fuel vapors generated in the fuel tank may be contained within the tank, and may not be routed to the fuel vapor canister, thus preventing loading of the canister after the refueling event. In an example where the FTIV is not included, the CVV may be maintained open, such that fuel vapors may be directed to the fuel vapor canister for storage.

Furthermore, at 645, method 600 may include returning the variable orifice valve to default conditions. More specifically, the controller may send a signal to the variable orifice valve commanding the variable orifice valve to a predetermined default orifice size. It may be understood that the predetermined default orifice size may comprise an orifice size substantially more closed than the fully open orifice size, for which the variable orifice valve was commanded during the refueling event. In some examples, the predetermined default orifice size may comprise an orifice that is fully closed.

Responsive to completion of the refueling event, closing of the FTIV (where included), and returning the variable orifice valve to default conditions, method 600 may proceed to method 700, depicted at FIG. 7.

Turning now to FIG. 7, a method 700 for conducting a fuel vapor purging operation, is shown. More specifically, method 700 may be used to conduct a purging operation, where conducting the purging operation is based on an inferred or measured canister load subsequent to completion of a refueling event.

Method 700 will be described with reference to the systems described herein and shown in FIGS. 1-3, though it should be understood that similar methods may be applied to other systems without departing from the scope of this disclosure. Method 700 continues from method 500, or method 600, and as such, method 700 may be carried out by a controller, such as controller 212 in FIG. 2, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIG. 1 and FIG. 2. The controller may transform operating states of the fuel system, and evaporative emissions system via actuators, such as CPV (e.g., 261), fuel tank isolation valve (FTIV) (e.g., 252), canister vent valve (CVV) (e.g., 297), fuel injectors (e.g. 266), etc., according to the method below.

Method 700 begins at 705 and may include indicating whether a vehicle-on event has occurred since completion of the refueling event, where completion of the refueling event may comprise completion of refueling of an ORVR vehicle at a gas station without offboard vapor recovery infrastructure (see FIG. 5), or completion of refueling of a non-ORVR vehicle at a gas station equipped with offboard vapor recovery infrastructure (see FIG. 6). A vehicle-on event may include a key-on event, for example. In another example, a vehicle-on event may comprise a remote-start event. Such examples are for illustrative purposes, and are not meant to be limiting. If, at 705, a vehicle-on event is not indicated, method 700 may proceed to 710. At 710, method 700 may include maintaining the status of the vehicle fuel system and evaporative emissions system. More specifically, the vehicle CPV, FTIV, CVV, and variable orifice valve may be maintained in their current configurations determined responsive to completion of the refueling event. Furthermore, method 700 may include continuing to monitor for a vehicle-on event.

Responsive to an indication of a vehicle-on event, method 700 may proceed to 715. At 715, it may be indicated as to whether the vehicle-on event further comprises an engine-on event. More specifically, for vehicles such as hybrid electric vehicles (HEV), or start/stop (S/S), a vehicle-on event may not correspondingly include activation of the vehicle engine. For example, a vehicle-on event may include operation of the vehicle in an electric mode of operation, where activation of the engine is not conducted.

If, at 715, an engine-on event is indicated, method 700 may proceed to 720. At 720, method 700 may include indicating whether purge conditions are met for purging the fuel vapor canister (e.g. 222) For example, purge conditions may include an engine-on condition, a canister load above a threshold, an intake manifold vacuum above a threshold, an estimate or measurement of temperature of an emission control device (e.g. 270) such as a catalyst being above a predetermined temperature associated with catalytic operation commonly referred to as light-off temperature, a non-steady state engine condition, and other operating conditions that would not be adversely affected by a canister purge operation. If at 720 canister purge conditions are not met, method 700 may proceed to 725. At 725, method 700 may include maintaining current fuel system and evaporative emissions system status. For example, maintaining current fuel system and evaporative emissions system status may include maintaining the vehicle CPV, FTIV, CVV, and variable orifice valve in their current conformations. In some examples, at 725, method 700 may further include updating a canister purge schedule to indicate that a purging event was not conducted, and a canister purge operation may be scheduled for the next opportunity responsive to canister purge conditions being met.

Alternatively, if, at 720, purge conditions are met, method 700 may proceed to 730. At 730, method 700 may include commanding open the CPV and commanding open or maintaining open the CVV. In some examples, commanding open the CPV may include gradually opening (e.g. ramping open) the CPV. Opening the CPV while concurrently opening or maintaining open the CVV may result in engine intake vacuum drawing fresh air into the canister to promote desorption of adsorbed fuel vapor within the fuel vapor canister, the purge gases routed to engine intake to be combusted. Proceeding to 735, method 700 includes purging the canister. At 740, purging the canister may include indicating an air/fuel ratio via, for example, a proportional plus integral feedback controller coupled to a two-state exhaust gas oxygen sensor, and responsive to the air/fuel indication and a measurement of inducted air flow, generating a base fuel command. To compensate for purge vapors, a reference air/fuel ratio, related to engine operation without purging, may be subtracted from the air/fuel ratio indication and the resulting error signal (compensation factor) generated. As such, the compensation factor may represent a learned value directly related to fuel vapor concentration, and may be subtracted from the base fuel command to correct for the induction of fuel vapors. The duration of the purging operation may be based on the learned value (or compensation factor) of the vapors such that when it is indicated there are no appreciable hydrocarbons in the vapors (the compensation is essentially zero), the purge may be ended. In other examples, a purge operation may be discontinued responsive to purge conditions no longer being met, for example if intake manifold vacuum decreases below a threshold value. Accordingly, following purging, method 700 may proceed to 745 and may include commanding closed the CPV. Following the closing of the CPV, method 700 may proceed to 750 wherein engine operating parameters may be updated. For example, at 750, updating engine operating parameters may include updating a canister purge schedule to indicate the completed canister purge event, updating the canister loading state to reflect the recent canister purge, etc. Method 700 may then end.

Returning to 715, responsive to an indication of a vehicle-on event, where it is further indicated that the vehicle-on event did not also include an engine-on event, method 700 may proceed to 760. At 760, method 700 may include indicating whether an inferred or measured canister loading state is greater than a purge threshold. For example, a purge threshold may include a predetermined amount of fuel vapors loaded in the fuel vapor canister where, if not purged, bleedthrough emissions stemming from the loaded canister may result. In one example, an ORVR vehicle may have been refueled at a gas station without offboard fuel vapor recovery infrastructure (see FIG. 5). In such an example, one or more temperature sensors may be utilized to indicate a canister loading state, as discussed above. Additionally or alternatively, canister loading state may in some examples be inferred as a function of an amount of fuel added to the fuel tank. For example, fuel fill level sensor (e.g. 234) may be utilized to determine an amount of fuel added to the fuel tank, and a canister load estimated based a predetermined amount of fuel vapors expected to migrate to the fuel vapor canister given the amount of fuel added to the tank.

In another example, an ORVR vehicle may have been refueled at a gas station equipped with offboard fuel vapor recovery infrastructure (see FIG. 6). In such an example, canister loading state may be measured via one or more temperature sensors, as discussed above. In another example, canister loading state may be inferred based on the duty cycle of the FTIV (or CVV), in conjunction with an indicated amount of fuel added to the fuel tank, as monitored via the fuel level sensor (e.g. 234). For example, for a given amount of fuel added to the tank, if the duty cycle comprises a mainly closed FTIV, then canister loading may be predicted to be lower than if the duty cycle comprises an open FTIV for a substantial portion of the refueling event. Such information may be stored in a lookup table stored at the controller, for example, which may thus enable an inferred canister load responsive to the recent refueling event.

Thus, with canister load measured or inferred, it may be determined at 760 whether the canister load is greater than the predetermined purge threshold. If, at 760, it is indicated that canister loading state is not greater than the predetermined purge threshold, then method 700 may proceed to 765. At 765, method 700 may include maintaining fuel system and evaporative emissions system status. For example, as discussed above, maintaining fuel system and evaporative emissions system status may include maintaining the status of the vehicle CPV, FTIV, CVV, etc. Method 700 may then end.

Alternatively, if at 760 it is indicated that inferred or measured canister loading state is greater than the purge threshold, method 700 may proceed to 770. At 770, method 700 may include activating the vehicle engine. Activating the vehicle engine may include providing fuel via fuel injector(s) (e.g. 266), and spark to engine cylinders, such that fuel is combusted by the vehicle engine. It may be understood that activation of the vehicle engine may involve a command from the controller (e.g. 212) to activate the engine, without input from the vehicle operator.

Responsive to activation of the vehicle engine, method 700 may proceed to 720. As discussed above, at 720 it may be indicated as to whether purging conditions are met. If purging conditions are met, method 700 may proceed to steps 730-750 as described above. For brevity, all such steps will not be reiterated here, but it may be understood that responsive to activation of the vehicle engine and an indication that purge conditions are met, method 700 may include purging the fuel vapor canister according to steps 730-750 as discussed in detail above. If, at 720, it is indicated that purge conditions are not met, then method 700 may include maintaining fuel system and evaporative emissions system status as discussed above, until purge conditions are indicated to be met.

While not explicitly shown, in some examples, responsive to an ORVR vehicle being refueled at a gas station without offboard fuel vapor recovery, upon indication that refueling is complete and that a vehicle-on event occurred without concurrent activation of the vehicle engine, the engine may be automatically activated in order to purge the fuel vapors from the canister. In such an example, activation of the engine and purging of the canister may be conducted as it may be expected that a refueling event of an ORVR vehicle at a gas station without offboard fuel vapor recovery infrastructure may load the canister enough to justify a purge of the fuel vapor canister to prevent potential undesired bleed emissions. Alternatively, in an example where an ORVR vehicle is refueled at a gas station equipped with offboard vapor recovery infrastructure, and where fuel vapors are routed to the offboard storage container, upon indication that refueling is complete and that a vehicle-on event occurred without concurrent activation of the vehicle engine, the engine may not be automatically activated to purge the canister. In such an example, it may be expected that a refueling event of an ORVR vehicle at a gas station equipped with offboard fuel vapor recovery infrastructure may not significantly load the canister to a point where potential bleed emissions may result. As such, the engine may not be activated to purge under such circumstances, without deferring to a measured or inferred canister loading state.

Turning now to FIG. 8, a timeline for conducting a refueling event of an ORVR vehicle according to the methods described herein and with reference to FIGS. 4-7, and as applied to the systems described herein and with reference to FIGS. 1-3. Timeline 800 includes plot 805, indicating whether the vehicle is on, or off, over time. Timeline 800 further includes plot 810, indicating whether the vehicle engine is on, or off, over time. Timeline 800 further includes plot 815, indicating whether a refueling event is requested, over time. Timeline 800 further includes plot 820, indicating whether an offboard fuel vapor recovery infrastructure at a particular gas station is indicated, over time. Timeline 800 further includes plot 825, indicating fuel system pressure as monitored by a fuel tank pressure transducer (FTPT) (e.g. 291), over time. Line 826 represents a fuel system pressure threshold where, if reached, an automatic shutoff of a refueling dispenser may result. Timeline 800 further includes plot 830, indicating an orifice (e.g. 253) status of a variable orifice valve (e.g. 254) positioned in a fuel vapor recirculation line (e.g. 231), over time. Timeline 800 further includes plot 835, indicating whether a fuel tank isolation valve (FTIV) (e.g. 252) is open, or closed, over time. Timeline 800 further includes plot 840, indicating a fuel tank fill level as monitored by a fuel level indicator (e.g. fuel level sensor) (e.g. 234), over time. Timeline 800 further includes plot 845, indicating a canister loading state, over time. Line 846 represents a threshold canister load where, if reached, the canister may be purged subsequent to completion of a refueling event. Timeline 800 further includes plot 850, indicating whether canister purge conditions are met, over time, for purging the fuel vapor canister. Furthermore, it may be understood that in timeline 800, the vehicle being discussed includes a FTIV, and canister vent valve (e.g. 297). Throughout timeline 800, while not explicitly shown it may be understood that the CVV is open.

At time t0, the vehicle is not in operation, and the engine is off, illustrated by plots 805 and 810, respectively. Refueling is not yet requested, indicated by plot 815. As refueling is not requested, whether or not an offboard fuel vapor recovery infrastructure is indicated, is not applicable (N/A), indicated by plot 820. Fuel tank pressure is positive (+) with respect to atmospheric pressure (atm.), indicated by plot 825, and the FTIV is closed, indicated by plot 835. The orifice (e.g. 253) of the variable orifice valve (e.g. 254) is closed, indicated by plot 830. Fuel level is indicated to be near empty, indicated by plot 840. Furthermore, canister load is near empty, indicated by plot 845. As the vehicle is not in operation with the engine operating, purge conditions are not indicated to be met, illustrated by plot 850.

At time t1, refueling is indicated to be requested, illustrated by plot 815. As discussed above, a request for refueling may comprise a vehicle operator depression of a refueling button on a vehicle instrument panel in the vehicle (e.g., refueling button 197), or a refueling door. In some examples, a refueling request may comprise a refueling operator requesting access to a fuel filler neck, for example, by attempting to open a refueling door, and/or attempting to remove a gas cap.

As a request for refueling is indicated at time t1, the FTIV is commanded open, to depressurize the fuel system prior to enabling fuel to be added to the fuel tank. Accordingly, between time t1 and t2, with the FTIV open, and the CVV open (not shown in timeline 800), the fuel tank may be coupled to atmosphere. Thus, pressure in the fuel system is indicated to return to atmospheric pressure.

Subsequent to depressurizing the fuel system between time t1 and t2, at time t2 offboard fuel vapor recovery infrastructure is indicated at the gas station the vehicle is requesting to be refueled at. As discussed above, such an indication may include the vehicle controller (e.g. 212) communicatively coupling to the gas station's computer system or network, via a wireless network (e.g. 131). For example, the vehicle controller may send a signal to the gas station, requesting information as to whether the gas station includes offboard fuel vapor recovery infrastructure. The requested information may be received and processed by the gas station's computational architecture, and the requested information may be sent back to the vehicle controller. Other examples may include the vehicle controller obtaining the requested information via the internet, where a website for a particular gas station may be configured to provide information pertaining to whether the gas station includes offboard fuel vapor recovery infrastructure. In still other examples, a vehicle GPS or other onboard navigation system may be utilized to determine vehicle location, and the controller may be configured to query the internet in order to retrieve information about a gas station positioned at a location that closely matches the indicated GPS location of the vehicle.

With offboard fuel vapor recovery infrastructure indicated at the gas station the vehicle is attempting to refuel at, at time t2 the orifice of the variable orifice valve is commanded by the controller to a fully open state (e.g. 100% open). Furthermore, a predetermined duty cycle of the FTIV may be initiated, resulting in a closing of the FTIV at time t2. As discussed above, the predetermined rate may be a rate that may ensure that a majority of the fuel vapors generated during refueling are directly to the offboard vapor recovery infrastructure, rather than being routed to the fuel vapor canister (e.g. 222).

Thus, between time t2 and t3, with the FTIV being duty cycled at the predetermined rate, the refueling event commences and fuel is indicated to be added to the fuel tank, illustrated by plot 840. Because the orifice of the variable orifice valve is configured to be fully open, and because the FTIV is being duty cycled at a rate where a majority of the time the FTIV is closed, fuel vapors generated during refueling may be routed to the offboard fuel vapor recovery infrastructure (e.g. offboard storage tank), rather than to the fuel vapor canister. Thus, canister load is indicated to only slightly increase between time t2 and t3. As discussed above, canister load may be indicated via temperature sensors (e.g. 232), where an increase in canister load is indicated by an increase in temperature. In another example, canister load may be inferred based on an amount of fuel added to the tank and the FTIV duty cycle. In either example, canister load is indicated to only slightly rise between time t2 and t3.

However, pressure in the fuel system rises between time t2 and t3, and at time t3, an adjustment to the FTIV duty cycle is initiated in order to prevent a premature shutoff of the fuel dispenser. More specifically, at time t3, pressure in the fuel system is indicated to be close to the fuel system pressure threshold (e.g. 12 InH2O), where, if reached, the pressure may trigger an automatic shutoff of the refueling dispenser pump. Accordingly, at time t3, the duty cycle of the FTIV is increased as compared to the duty cycle between time t2 and t3.

Thus, between time t3 and t4, with the duty cycle of the FTIV adjusted, pressure in the fuel system remains close to the fuel system pressure threshold, but does not reach the fuel system pressure threshold level. As such, the FTIV duty cycle between time t3 and t4 may represent a duty cycle that is optimal for directing as much fuel vapors as possible to the offboard vapor recovery infrastructure, without reaching the fuel system pressure threshold. Furthermore, between time t3 and t4, fuel in the fuel tank is indicated to continue to rise. Canister load only slightly increases, however, as the duty cycle of the FTIV prevents much of the fuel vapors from migrating to the fuel vapor canister.

However, at time t4 pressure in the fuel system again is indicated to rise, and as such, the FTIV duty cycle may be further adjusted in order to prevent the fuel system pressure from reaching the fuel system pressure threshold. Accordingly, at time t4, the FTIV duty cycle is increased compared to the duty cycle between time t3 and t4.

Between time t4 and t5, with the FTIV duty cycle further adjusted, pressure in the fuel system remains below the fuel system pressure threshold. Fuel is continued to be added to the fuel tank, illustrated by plot 840. Because the duty cycle of the FTIV is increased a second time, canister load (inferred or measured) is indicated to increase at a slightly greater rate than when the FTIV duty cycle was decreased (e.g. between times t2 and t3, and between times t3 and t4).

Between time t5 and t6 however, pressure in the fuel system rapidly increases, even with the FTIV open, and then decreases to atmospheric pressure by time t6. Such a rapid increase in fuel pressure may be understood to be due to the fill level vent valve (e.g. 273) closing as a result of fuel being added to the capacity (e.g. full tank) of the fuel tank. With the FLVV closed due to fuel level rise, pressure in the fuel tank may rapidly build, thus inducing an automatic shutoff of the refueling dispenser pump. As the fuel dispenser pump is automatically shut off, fuel level in the fuel tank plateaus, indicated by plot 840. Similarly, canister load is indicated to additionally plateau, indicated by plot 845.

As pressure in the fuel tank decays to atmospheric pressure at time t6, the orifice of the variable orifice valve is commanded to a predetermined default orifice size. In this example timeline, the predetermined default orifice size may comprise a closed orifice. Furthermore, as refueling is indicated to be complete (e.g. fuel level plateaued for a predetermined duration), the FTIV may be commanded closed.

At time t7, the vehicle is turned on. As such, with refueling complete and the vehicle turned on, it is no longer applicable whether the vehicle is positioned at a gas station equipped with an offboard fuel vapor recovery infrastructure, indicated by plot 820. Furthermore, while the vehicle is indicated to be turned on at time t7, the engine is not indicated to be concurrently activated (e.g. turned on). Thus, it may be determined whether a fuel vapor canister load is above the threshold canister load. Because the canister load (inferred or measured) is indicated to be below the threshold canister load, the engine is not actively turned on in order to purge the fuel vapor canister. As such, purge conditions are not indicated to be met, illustrated by plot 850. Thus, between time t7 and t8, the vehicle continues to operate without activating the engine to purge the canister.

In this way, an ORVR vehicle may be refueled at a gas station that is equipped for offboard fuel vapor recovery, and may further route fuel vapors generated during the refueling event to the offboard fuel vapor recovery infrastructure. By routing fuel vapors generated during refueling to the offboard fuel vapor recovery infrastructure, loading of the fuel vapor canister onboard the vehicle may be reduced. Furthermore, by routing fuel vapors from an ORVR vehicle to an offboard fuel vapor recovery infrastructure, wear and tear of the offboard system may be reduced, and issues associated with excess air being ingested into the offboard storage tank (e.g. undesired pressure buildup) may additionally be prevented. Further still, by reducing loading of the fuel vapor canister of an ORVR vehicle during refueling, potential bleedthrough of fuel vapors from the fuel vapor canister may be reduced, as compared to conditions where the ORVR vehicle is refueled at a gas station equipped with offboard fuel vapor recovery infrastructure, but where the fuel vapors are routed to the canister instead of to the offboard storage tank.

The technical effect is to recognize that by commanding open a variable orifice valve positioned in a recirculation line of an ORVR vehicle system, and commanding either a fuel tank isolation valve or a canister vent valve to be duty cycled, an ORVR vehicle may effectively route fuel vapors generated during refueling to an offboard fuel vapor recovery infrastructure. Thus, an ORVR vehicle may effectively reduce loading of an onboard fuel vapor canister, which may increase functional lifetime of the fuel vapor canister. Furthermore, the routing of fuel vapors to the offboard fuel vapor recovery infrastructure may be accomplished with components already configured in an ORVR vehicle, thus no additional costs may be incurred in terms of implementing the strategies for routing refueling vapors from an ORVR vehicle to offboard storage.

The systems described herein and with reference to FIGS. 1-3, along with the methods described herein and with reference to FIGS. 4-7, may enable one or more systems and one or more methods. In one example, a method comprises during refueling a fuel tank of a vehicle at a gas station, routing fuel vapors from the fuel tank to a fuel vapor storage canister positioned in an evaporative emissions system that is removably coupled to the fuel tank; and during the refueling, adjusting a rate of the routing fuel vapors to the canister responsive to an indication of a vehicle offboard fuel vapor recovery infrastructure at the gas station. In a first example of the method, the method further includes wherein adjusting the rate of routing fuel vapors from the fuel tank to the fuel vapor canister includes decreasing the rate of routing fuel vapors from the fuel tank to the fuel vapor canister responsive to the indication of the offboard fuel vapor recovery infrastructure, as compared to a condition where offboard fuel vapor recovery infrastructure is not indicated. A second example of the method optionally includes the first example and further comprises monitoring pressure in the fuel tank during refueling the fuel tank; and wherein adjusting the rate of routing fuel vapors from the fuel tank to the fuel vapor storage canister includes adjusting the rate of routing fuel vapors from the fuel tank to the fuel vapor storage canister to prevent an automatic shutoff of a refueling dispenser providing fuel to the fuel tank. A third example of the method optionally includes any one or more or each of the first and second examples and further comprises controlling flow of air and fuel vapor from the fuel tank to the fuel vapor canister by regulating a fuel tank isolation valve positioned in a conduit coupling the fuel tank to the fuel vapor storage canister; and wherein adjusting the rate of routing fuel vapors from the fuel tank to the fuel vapor canister is accomplished at least in part by duty cycling the fuel tank isolation valve. A fourth example of the method optionally includes any one or more or each of the first through third examples and further comprises controlling flow of air and fuel vapor from the fuel tank to the fuel vapor canister, and from the fuel vapor canister to atmosphere, by regulating a canister vent valve positioned in a fresh air line coupling the fuel vapor canister to atmosphere; and wherein adjusting the rate of routing fuel vapors from the fuel tank to the fuel vapor canister is accomplished at least in part by duty cycling the canister vent valve. A fifth example of the method optionally includes any one or more or each of the first through fourth examples and further comprises recirculating at least a portion of fuel vapors from the fuel tank into a recirculation line during refueling, the recirculation line coupling the fuel tank to a fuel filler neck of the fuel tank; and wherein adjusting the rate of routing fuel vapors from the fuel tank to the fuel vapor canister includes increasing a rate at which fuel vapors are routed through the recirculation line and to the fuel filler neck, as compared to a condition where offboard fuel vapor recovery infrastructure is not indicated. A sixth example of the method optionally includes any one or more or each of the first through fifth examples and further includes wherein adjusting the rate of routing fuel vapors from the fuel tank to the fuel vapor canister is accomplished at least in part by commanding open a variable orifice valve positioned in the recirculation line. A seventh example of the method optionally includes any one or more or each of the first through sixth examples and further includes wherein responsive to adjusting the rate of routing fuel vapors from the fuel tank to the fuel vapor storage canister, a greater portion of refueling vapors are directed to the offboard fuel vapor storage infrastructure, than to the fuel vapor storage canister. An eighth example of the method optionally includes any one or more of the first through seventh examples and further comprises sending a wireless request for information as to whether the gas station where the refueling is occurring is equipped with offboard fuel vapor recovery infrastructure; receiving a wireless response; and indicating whether the gas station is equipped with offboard fuel vapor recovery infrastructure based on the receiving of the wireless response.

An example of a system for a vehicle comprises a fuel tank positioned in a fuel system, configured to provide fuel to an engine; a fuel filler neck on the fuel tank, configured to receive fuel from a refueling dispenser for adding fuel the fuel tank; an evaporative emissions system; a fuel vapor canister positioned in the evaporative emissions system; a fuel tank isolation valve, positioned in a conduit between the fuel tank and the fuel vapor canister; a fuel vapor recirculation line, coupling the fuel tank to the fuel filler neck; a variable orifice valve, positioned in the fuel vapor recirculation line, where an orifice size of the variable orifice valve is adjustable; and a controller, storing instructions in non-transitory memory, that when executed, cause the controller to: in a first condition, route fuel vapors generated during refueling primarily to the fuel vapor storage canister; and in a second condition, route fuel vapors generated during refueling primarily to an offboard fuel vapor recovery infrastructure. In a first example, the system further includes wherein the controller further stores instructions in non-transitory memory, that when executed, cause the controller to: send a wireless request for information pertaining to whether a refueling station is equipped with offboard fuel vapor recovery infrastructure; receive a wireless response; and indicate a presence or an absence of offboard fuel vapor recovery infrastructure responsive to the received wireless response. A second example of the system optionally includes the first example and further includes wherein the controller further stores instructions in non-transitory memory, that when executed, cause the controller to: route fuel vapors generated during refueling primarily to the fuel vapor storage canister, according to the first condition, responsive to the indicated absence of offboard fuel vapor recovery infrastructure; and route fuel vapors generated during refueling primarily to the offboard fuel vapor recovery infrastructure, according to the second condition, responsive to the indicated presence of offboard fuel vapor recovery infrastructure. A third example of the system optionally includes any one or more or each of the first and second examples and further includes wherein the controller further stores instructions in non-transitory memory, that when executed, cause the controller to: in the first condition, command or maintain the variable orifice valve to a predetermined orifice size, where the predetermined orifice size is based at least partially on a size and a loading capacity of the fuel vapor canister; and in the second condition, command the variable orifice valve to a fully open position. A fourth example of the system optionally includes any one or more or each of the first through third examples and further includes wherein the controller further stores instructions in non-transitory memory, that when executed, cause the controller to: in the first condition, command open or maintain open the fuel tank isolation valve, without duty cycling the fuel tank isolation valve; and in the second condition, duty cycle the fuel tank isolation valve at a predetermined rate. A fifth example of the system optionally includes any one or more or each of the first through fourth examples and further comprises a canister vent valve, positioned in a vent line between the fuel vapor canister and atmosphere; and wherein the controller further stores instructions in non-transitory memory, that when executed, cause the controller to: responsive to an indication that the vehicle does not include a fuel tank isolation valve: in the first condition, command open or maintain open the canister vent valve, without duty cycling the canister vent valve; and in the second condition, duty cycle the canister vent valve at a predetermined rate. A sixth example of the system optionally includes any one or more or each of the first through fifth examples and further comprises a fuel tank pressure transducer, positioned in the fuel system; and wherein the controller further stores instructions in non-transitory memory, that when executed, cause the controller to: in the second condition, monitor pressure in the fuel system via the fuel tank pressure transducer; and control the duty cycle of the fuel tank isolation valve to prevent undesired automatic shutoff of the refueling dispenser. A seventh example of the system optionally includes any one or more or each of the first through sixth examples and further includes wherein the predetermined rate for duty cycling the fuel tank isolation valve includes a rate that directs fuel vapors generated during refueling primarily to the offboard fuel vapor recovery infrastructure, rather than to the fuel vapor storage canister. An eighth example of the system optionally includes any one or more or each of the first through seventh examples and further comprises one or more temperature sensors coupled to and/or within the fuel vapor storage canister; a canister purge valve positioned in a purge conduit between the fuel vapor canister and the engine; and wherein the controller further stores instructions in non-transitory memory, that when executed, cause the controller to: monitor a loading state of the fuel vapor canister in both the first condition and in the second condition; and responsive to a vehicle-on and engine-off condition, subsequent to completion of refueling, and an indicated canister loading state below a predetermined purge threshold, maintain the engine off and maintain the canister purge valve in a closed conformation.

Another example of the method comprises during refueling of a vehicle equipped with onboard refueling vapor recovery, where the onboard refueling vapor recovery includes a fuel vapor canister positioned in an evaporative emissions system, the fuel vapor canister removably coupled to a fuel tank positioned in a fuel system and configured to capture and store fuel vapors generated during refueling of the tank; actively routing fuel vapors generated during refueling primarily to an offboard fuel vapor recovery infrastructure and not to the fuel vapor canister responsive to an indication that a gas station where the vehicle is attempting to refuel is equipped with offboard fuel vapor recovery infrastructure; and actively routing fuel vapors generated during refueling primarily to the fuel vapor canister, responsive to an indication that a gas station where the vehicle is attempting to refuel is not equipped with offboard fuel vapor recovery infrastructure. In a first example of the method, the method further comprises controlling the flow of air and fuel vapors from the fuel tank to the fuel vapor canister by controlling a fuel tank isolation valve positioned between the fuel tank and the fuel vapor canister; controlling the flow of air and fuel vapors from the fuel tank to the offboard fuel vapor recovery infrastructure via a variable orifice valve positioned in a fuel vapor recirculation line, the fuel vapor recirculation line connecting the fuel tank to a fuel filler neck of the fuel tank; wherein actively routing fuel vapors generated during refueling primarily to the fuel vapor canister includes commanding open the fuel tank isolation valve and commanding the variable orifice valve to restrict an orifice size of the variable orifice valve to a predetermined orifice size; and wherein actively routing fuel vapors generated during refueling primarily to the offboard fuel vapor recovery infrastructure includes duty cycling the fuel tank isolation valve at a predetermined duty cycle rate, and commanding open the variable orifice valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
via a controller with instructions therein,
during refueling a fuel tank of a vehicle at a gas station storage tank, routing fuel vapors from the fuel tank to a fuel vapor storage canister positioned in an onboard evaporative emissions system that is coupled to the fuel tank;
during the refueling, adjusting a rate of the routing fuel vapors to the fuel vapor storage canister by controlling a duty cycle of a valve that selectively couples the fuel tank to atmosphere responsive to an indication of a vehicle offboard fuel vapor recovery infrastructure at a gas station;
adjusting a fuel vapor storage canister load threshold as a function of an expected loading of the fuel vapor storage canister during the refueling;
monitoring a fuel vapor storage canister load during the refueling; and
comparing the fuel vapor storage canister load to the fuel vapor storage canister load threshold to indicate whether the valve is functioning as desired.

2. The method of claim 1, wherein adjusting the rate of routing fuel vapors from the fuel tank to the fuel vapor storage canister includes decreasing the rate of routing fuel vapors from the fuel tank to the fuel vapor storage canister responsive to the indication of the vehicle offboard fuel vapor recovery infrastructure, as compared to a condition where the vehicle offboard fuel vapor recovery infrastructure is not indicated.

3. The method of claim 1, further comprising:
monitoring a pressure in the fuel tank during refueling the fuel tank; and
wherein adjusting the rate of routing fuel vapors from the fuel tank to the fuel vapor storage canister includes adjusting the rate of routing fuel vapors from the fuel tank to the fuel vapor storage canister to prevent an automatic shutoff of a refueling dispenser providing fuel to the fuel tank.

4. The method of claim 1, wherein the valve comprises:
a fuel tank isolation valve positioned in a conduit coupling the fuel tank to the fuel vapor storage canister.

5. The method of claim 1, wherein the valve comprises: a canister vent valve positioned in a fresh air line coupling the fuel vapor storage canister to atmosphere.

6. The method of claim 1, further comprising;
recirculating at least a portion of fuel vapors from the fuel tank into a recirculation line during the refueling, the recirculation line coupling the fuel tank to a fuel filler neck of the fuel tank; and
wherein adjusting the rate of routing fuel vapors from the fuel tank to the fuel vapor storage canister further comprises increasing a rate at which fuel vapors are routed through the recirculation line and to the fuel filler neck, as compared to a condition where the vehicle offboard fuel vapor recovery infrastructure is not indicated.

7. The method of claim 6, wherein increasing the rate at which fuel vapors are routed through the recirculation line and to the fuel filler neck includes commanding open a variable orifice valve positioned in the recirculation line.

8. The method of claim 1, wherein, responsive to adjusting the rate of routing fuel vapors from the fuel tank to the fuel vapor storage canister, a greater portion of refueling vapors are directed to the vehicle offboard fuel vapor recovery infrastructure than to the fuel vapor storage canister.

9. The method of claim 1, further comprising:
sending a wireless request for information as to whether the gas station where the refueling is occurring is equipped with the vehicle offboard fuel vapor recovery infrastructure;
receiving a wireless response; and
indicating whether the gas station is equipped with the vehicle offboard fuel vapor recovery infrastructure based on the receiving of the wireless response.

10. The method of claim 1, wherein monitoring the fuel vapor storage canister load during the refueling is via one or more temperature sensors coupled to the fuel vapor canister.

11. The method of claim 1, further comprising:
monitoring an amount of fuel added to the fuel tank during the refueling; and
wherein the expected loading of the fuel vapor storage canister is related to the amount of fuel added to the fuel tank during the refueling.

12. The method of claim 3, wherein the expected loading of the fuel vapor storage canister is related to the pressure in the fuel tank during refueling the fuel tank.

13. The method of claim 1, further comprising:
indicating that the valve is not functioning as desired in response to the fuel vapor storage canister load being greater than the fuel vapor storage canister load threshold during the refueling.

14. The method of claim 13, further comprising:
in response to the indication that the valve is not functioning as desired, illuminating a malfunction indicator light indicative of a need to service the vehicle.

* * * * *